US006881772B2

(12) United States Patent
Gugumus

(10) Patent No.: US 6,881,772 B2
(45) Date of Patent: Apr. 19, 2005

(54) STABILIZER MIXTURES

(75) Inventor: François Gugumus, Allschwil (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 19 days.

(21) Appl. No.: 10/164,812

(22) Filed: Jun. 7, 2002

(65) Prior Publication Data

US 2003/0013785 A1 Jan. 16, 2003

Related U.S. Application Data

(63) Continuation of application No. 09/211,198, filed on Dec. 14, 1998, now abandoned.

(51) Int. Cl.⁷ .................... C08K 5/3435; C08K 5/3492; C08K 3/22; C08K 5/098
(52) U.S. Cl. .................. 524/99; 524/100; 524/102; 524/399; 524/400; 524/432; 524/436
(58) Field of Search ............... 524/99–100, 102, 524/399–400, 432, 436

(56) References Cited

U.S. PATENT DOCUMENTS

| | | | |
|---|---|---|---|
| 4,929,652 A | 5/1990 | Gugumus | 524/91 |
| 5,025,051 A | 6/1991 | Sato et al. | 524/99 |
| 5,037,870 A | 8/1991 | Gugumus | 524/102 |
| 5,134,181 A | 7/1992 | Masina | 524/100 |
| 5,180,762 A | 1/1993 | Canova | 524/100 |
| 5,283,273 A | 2/1994 | Sander et al. | 524/90 |
| 5,350,785 A | 9/1994 | Sander et al. | 524/100 |
| 5,597,857 A | 1/1997 | Thibaut et al. | 524/400 |
| 5,891,235 A | 4/1999 | Suzuki et al. | 524/100 |
| 6,172,153 B1 | 1/2001 | Starsinic | 524/400 |

FOREIGN PATENT DOCUMENTS

| | | |
|---|---|---|
| DE | 19545896 | 6/1996 |
| EP | 0212559 | 3/1987 |
| EP | 0276923 | 8/1988 |
| EP | 0290388 | 11/1988 |
| EP | 0309401 | 3/1989 |
| EP | 0429731 | 6/1991 |
| EP | 0468923 | 1/1992 |
| EP | 0565184 | 10/1993 |
| EP | 0661341 | 7/1995 |
| EP | 0690094 | 1/1996 |
| EP | 0768336 | 4/1997 |
| EP | 0791630 | 8/1997 |
| EP | 0796888 | 9/1997 |
| GB | 2252324 | 8/1992 |
| GB | 2293827 | 4/1996 |
| GB | 2332677 | 6/1999 |
| GB | 2332678 | 6/1999 |
| WO | 9525767 | 9/1995 |

OTHER PUBLICATIONS

Chem. Abstr. 106:197407z (1987).
Chem. Abstr. 125:116779q (1996) for DE 19545896.
Derwent Abstr. 96–278994/29 for DE 1954896.
"General Chemistry", D.A. McQuarrie and P.A. Rock, 2$^{nd}$ Edition (1987), W.H. Freeman & Co., New York, p. 709.
"Photodegradation, Photo–oxidation and Photostabilization of Polymers, Principles and Applications", B. Ranby and J.F. Rabek, John Wiley & Sons, New York, 1975, pp. 418–419.
R. Gächter and H. Müller, "Plastics Additives Handbook", Hanser Publishers (1990), pp. 48–49 and 66.

*Primary Examiner*—Peter Szekely
(74) *Attorney, Agent, or Firm*—Shiela A. Loggins

(57) ABSTRACT

A stabilizer mixture containing
(A) a sterically hindered amine compound,
(B) an organic salt of Ca or an inorganic salt of Ca and
(C) an organic salt of Mg, an inorganic salt of Mg, an organic salt of Zn or an inorganic salt of Zn;
with the proviso that component (C) is Mg-hydroxide-carbonate, Zn-hydroxide-carbonate or dolomite, when component (B) is calcium stearate.

9 Claims, No Drawings

STABILIZER MIXTURES

This is a continuation of application Ser. No. 09/211,198, filed Dec. 14, 1998, now abandoned.

The present invention relates to a stabilizer mixture containing a sterically hindered amine compound, a Ca compound and an Zn or Mg compound, the use of this mixture for stabilizing a polyolefin against degradation induced by light, heat or oxidation and the polyolefin thus stabilized.

The stabilization of polyolefins is described in numerous publications, for example in U.S. Pat. No. 4,929,652, U.S. Pat. No. 5,025,051, U.S. Pat. No. 5,037,870, EP-A-276,923, EP-A-290,388, EP-A-429,731, EP-A-468,923, EP-A-565,184, EP-A-690,094, GB-A-2,252,324, DE-A-19,545,896 (Derwent 96-278,994/29; Chemical Abstracts 125:116779q), WO-A-95/25,767 and Chemical Abstracts 106:197407z.

In more detail, the present invention relates to a stabilizer mixture containing (A) a sterically hindered amine compound, (B) an organic salt of Ca or an inorganic salt of Ca and (C) an organic salt of Mg, an inorganic salt of Mg, an organic salt of Zn or an inorganic salt of Zn;

with the proviso that component (C) is Mg-hydroxide-carbonate, Zn-hydroxide-carbonate or dolomite, when component (B) is calcium stearate.

Component (C) is in particular Mg-hydroxide-carbonate, Zn-hydroxide-carbonate or dolomite, when component (B) is an organic salt of Ca.

The sterically hindered amine is preferably a compound containing at least one group of the formula (I) or (II)

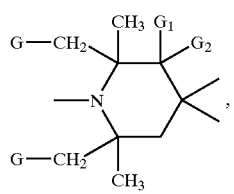

(I)

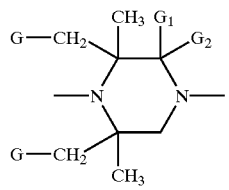

(II)

in which G is hydrogen or methyl, and $G_1$ and $G_2$, independently of one another, are hydrogen, methyl or together are a substituent =O.

More detailed examples of sterically hindered amines are described below under classes (a') to (i').

(a') A compound of the formula (Ia)

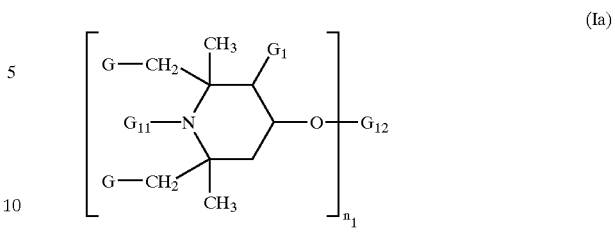

(Ia)

in which n, is a number from 1 to 4, G and $G_1$, independently of one another, are hydrogen or methyl, $G_{11}$ is hydrogen, O⁻, hydroxyl, $C_1$–$C_{18}$alkyl, $C_3$–$C_8$alkenyl, $C_3$–$C_8$alkynyl, $C_7$–$C_{12}$aralkyl, $C_1$–$C_{18}$alkoxy, $C_5$–$C_8$cycloalkoxy, $C_7$–$C_9$phenylalkoxy, $C_1$–$C_8$alkanoyl, $C_3$–$C_5$alkenoyl, $C_1$–$C_{18}$alkanoyloxy, glycidyl or a group of the formula —$CH_2CH(OH)$-Z, in which Z is hydrogen, methyl or phenyl, $G_{11}$ preferably being H, $C_1$–$C_4$alkyl, allyl, benzyl, acetyl or acryloyl, and $G_{12}$, if $n_1$ is 1, is hydrogen, $C_1$–$C_{18}$alkyl which is uninterrupted or interrupted by one or more oxygen atoms, cyanoethyl, benzoyl, glycidyl, a monovalent radical or an aliphatic, cycloaliphatic, araliphatic, unsaturated or aromatic carboxylic acid, carbamic acid or phosphorus-containing acid or a monovalent silyl radical, preferably a radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —$COOZ_{12}$ groups, in which $Z_{12}$ is H, $C_1$–$C_{20}$alkyl, $C_3$–$C_{12}$alkenyl, $C_5$–$C_7$cycloalkyl, phenyl or benzyl, $G_{12}$, if $n_1$ is 2, is $C_2$–$C_{12}$alkylene, $C_4$–$C_{12}$alkenylene, xylylene, a divalent radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 carbon atoms, or a cycloaliphatic or aromatic dicarboxylic acid having 8–14 carbon atoms or of an aliphatic, cycloaliphatic or aromatic dicarbamic acid having 8–14 carbon atoms, where each dicarboxylic acid may be substituted in the aliphatic, cycloaliphatic or aromatic moiety by one or two —$COOZ_{12}$ groups, $G_{12}$, if $n_1$ is 3, is a trivalent radical of an aliphatic, cycloaliphatic or aromatic tricarboxylic acid, which may be substituted in the aliphatic, cycloaliphatic or aromatic moiety by —$COOZ_{12}$, of an aromatic tricarbamic acid or of a phosphorus-containing acid, or is a trivalent silyl radical, and $G_{12}$, if $n_1$ is 4, is a tetravalent radical of an aliphatic, cycloaliphatic or aromatic tetracarboxylic acid.

The carboxylic acid radicals mentioned above are in each case taken to mean radicals of the formula (—CO)$_x$R, where x is as defined above, and the meaning of R arises from the definition given.

Alkyl with up to 20 carbon atoms is, for example, methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl.

$C_3$–$C_8$alkenyl $G_{11}$ can be, for example, 1-propenyl, allyl, methallyl, 2-butenyl, 2-pentenyl, 2-hexenyl, 2-octenyl, or 4-tert-butyl-2-butenyl.

$C_3$–$C_8$alkynyl $G_{11}$ is preferably propargyl.

$C_7$–$C_{12}$aralkyl $G_{11}$ is, in particular, phenethyl, especially benzyl.

$C_1$–$C_{18}$alkoxy $G_{11}$ is, for example, methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. $C_6$–$C_{12}$alkoxy, in particular heptoxy and octoxy, is preferred.

$C_5$–$C_8$cycloalkoxy $G_{11}$ is, for example, cyclopentoxy, cyclohexoxy, cycloheptoxy, cyclooctoxy, cyclodecyloxy and cyclododecyloxy. $C_5$–$C_8$cycloalkoxy, in particular cyclopentoxy and cyclohexoxy, is preferred.

$C_7$–$C_9$phenylalkoxy is, for example, benzyloxy.

$C_1$–$C_8$alkanoyl $G_{11}$ is, for example, formyl, propionyl, butyryl, octanoyl, but preferably acetyl and $C_3$–$C_5$alkenoyl $G_{11}$ is in particular acryloyl.

$C_1$–$C_{18}$alkanoyloxy $G_{11}$ is, for example, formyloxy, acetyloxy, propionyloxy, butyryloxy, valeryloxy, lauroyloxy, palmitoyloxy and stearoyloxy.

Examples of several $G_{12}$ radicals are given below.

If $G_{12}$ is a monovalent radical of a carboxylic acid, it is, for example, an acetyl, caproyl, stearoyl, acryloyl, methacryloyl, benzoyl or β-(3,5-di-tert-butyl-4-hydroxyphenyl)propionyl radical.

If $G_{12}$ is a monovalent silyl radical, it is, for example, a radical of the formula —$(C_jH_{2j})$—$Si(Z')_2Z''$, in which j is an integer in the range from 2 to 5, and Z' and Z'', independently of one another, are $C_1$–$C_4$alkyl or $C_1$–$C_4$alkoxy.

If $G_{12}$ is a divalent radical of a dicarboxylic acid, it is, for example, a malonyl, succinyl, glutaryl, adipoyl, suberoyl, sebacoyl, maleoyl, itaconyl, phthaloyl, dibutylmalonyl, dibenzylmalonyl, butyl(3,5-di-tert-butyl-4-hydroxybenzyl)malonyl or bicycloheptenedicarbonyl radical or a group of the formula

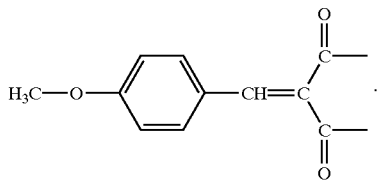

If $G_{12}$ is a trivalent radical of a tricarboxylic acid, it is, for example, a trimellitoyl, citryl or nitrilotriacetyl radical.

If $G_{12}$ is a tetravalent radical of a tetracarboxylic acid, it is, for example, the tetravalent radical of butane-1,2,3,4-tetracarboxylic acid or of pyromellitic acid.

If $G_{12}$ is a divalent radical of a dicarbamic acid, it is, for example, hexamethylenedicarbamoyl or 2,4-toluylenedicarbamoyl radical.

Preference is given to compounds of the formula (Ia) in which G and $G_1$ are hydrogen, $G_{11}$ is hydrogen or methyl, $n_1$ is 2 and $G_{12}$ is the diacyl radical of an aliphatic dicarboxylic acid having 4–12 carbon atoms.

Examples of polyalkylpiperidine compounds from this class are the following compounds:
1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-yl β-(3,5-di-tert-butyl-4-hydroxyphenyl)propionate
9) di(1-benzyl-2,2,6,6-tetramethylpiperidin-4-yl)maleate
10) di(2,2,6,6-tetramethylpiperidin-4-yl)succinate
11) di(2,2,6,6-tetramethylpiperidin-4-yl)glutarate
12) di(2,2,6,6-tetramethylpiperidin-4-yl)adipate
13) di(2,2,6,6-tetramethylpiperidin-4-yl)sebacate
14) di(1,2,2,6,6-pentamethylpiperidin-4-yl)sebacate
15) di(1,2,3,6-tetramethyl-2,6-diethyl-piperidin-4-yl)sebacate
16) di(1-allyl-2,2,6,6-tetramethylpiperidin-4-yl)phthalate
17) 1-hydroxy-4-β-cyanoethoxy-2,2,6,6-tetramethylpiperidine
18) 1-acetyl-2,2,6,6-tetramethylpiperidin-4-yl acetate
19) tri(2,2,6,6-tetramethylpiperidin-4-yl)trimellitate
20) 1-acryloyl-4-benzyloxy-2,2,6,6-tetramethylpiperidine
21) di(2,2,6,6-tetramethylpiperidin-4-yl)diethylmalonate
22) di(1,2,2,6,6-pentamethylpiperidin-4-yl)dibutylmalonate
23) di(1,2,2,6,6-pentamethylpiperidin-4-yl)butyl(3,5-di-tert-butyl-4-hydroxybenzyl)malonate
24) di(1-octyloxy-2,2,6,6-tetramethylpiperidin-4-yl)sebacate
25) di(1-cyclohexyloxy-2,2,6,6-tetramethylpiperidin-4-yl)sebacate
26) hexane-1',6'-bis(4-carbamoyloxy-1-n-butyl-2,2,6,6-tetramethylpiperidine)
27) toluene-2',4'-bis-(4-carbamoyloxy-1-n-propyl-2,2,6,6-tetramethylpiperidine)
28) dimethylbis(2,2,6,6-tetramethylpiperidin-4-oxy)silane
29) phenyltris(2,2,6,6-tetramethylpiperidin-4-oxy)silane
30) tris(1-propyl-2,2,6,6-tetramethylpiperidin-4-yl)phosphite
30-a) tris(1-methyl-2,2,6,6-tetramethylpiperidin-4-yl)phosphite
31) tris(1-propyl-2,2,6,6-tetramethylpiperidin-4-yl)phosphate
32) phenyl bis(1,2,2,6,6-pentamethylpiperidin-4-yl)phosphonate
33) 4-hydroxy-1,2,2,6,6-pentamethylpiperidine
34) 4-hydroxy-N-hydroxyethyl-2,2,6,6-tetramethylpiperidine
35) 4-hydroxy-N-(2-hydroxypropyl)-2,2,6,6-tetramethylpiperidine
36) 1-glycidyl-4-hydroxy-2,2,6,6-tetramethylpiperidine
36-a) 1,2,3,4-tetrakis[2,2,6,6-tetramethylpiperidin-4-yloxycarbonyl]butane
36-b) 1,2,3,4-tetrakis[1,2,2,6,6-pentamethylpiperidin-4-yloxycarbonyl]butane
36-c) 2,2,6,6-tetramethylpiperidin-4-yloxycarbonyl ($C_{15}$–$C_{17}$alkane)

36-d)

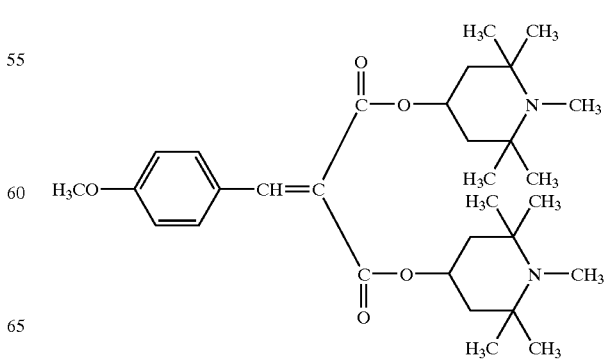

36-e)

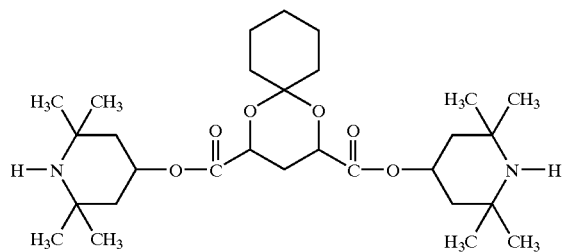

(b') A compound of the formula (Ib)

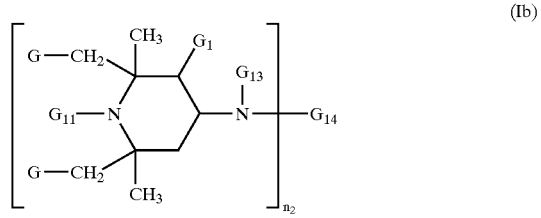

in which $n_2$ is the number 1, 2 or 3, G, $G_1$ and $G_{11}$ are as defined under (a'), $G_{13}$ is hydrogen, $C_1$–$C_{12}$alkyl, $C_2$–$C_5$hydroxyalkyl, $C_5$–$C_7$cycloalkyl, $C_7$–$C_8$aralkyl, $C_1$–$C_{18}$alkanoyl, $C_3$–$C_5$alkenoyl, benzoyl or a group of the formula

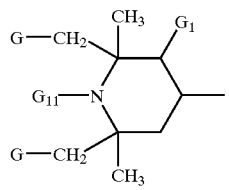

and $G_{14}$, if $n_2$ is 1, is hydrogen, $C_1$–$C_{18}$alkyl, $C_3$–$C_8$alkenyl, $C_5$–$C_7$cycloalkyl, $C_1$–$C_4$alkyl which is substituted by a hydroxyl, cyano, alkoxycarbonyl or carbamide group, glycidyl, a group of the formula —CH$_2$—CH(OH)-Z or of the formula —CONH-Z, in which Z is hydrogen, methyl or phenyl;

$G_{14}$, if $n_2$ is 2, is $C_2$–$C_{12}$alkylene, $C_6$–$C_{12}$arylene, xylylene, a —CH$_2$—CH(OH)—CH$_2$ group or a —CH$_2$—CH(OH)—CH$_2$—O-D-O— group, in which D is $C_2$–$C_{10}$alkylene, $C_6$–$C_{15}$arylene, $C_6$–$C_{12}$cycloalkylene, or, provided that $G_{13}$ is not alkanoyl, alkenoyl or benzoyl, $G_{14}$ can alternatively be 1-oxo-$C_2$–$C_{12}$alkylene, a divalent radical of an aliphatic, cycloaliphatic or aromatic dicarboxylic acid or dicarbamic acid or alternatively the group —CO—, $G_{14}$, if $n_2$ is 3, is a group

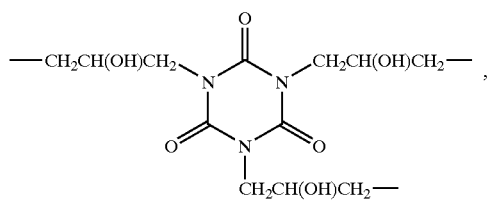

or, if $n_2$ is 1, $G_{13}$ and $G_{14}$ together can be the divalent radical of an aliphatic, cycloaliphatic or aromatic 1,2- or 1,3-dicarboxylic acid.

Some examples for the radicals $G_{13}$, $G_{14}$ and D are given below.

Any alkyl substituents are as defined above for (a').

Any $C_5$–$C_7$cycloalkyl substituents are, in particular, cyclohexyl.

$C_7$–$C_8$aralkyl $G_{13}$ is, in particular, phenylethyl or especially benzyl.

$C_2$–$C_5$hydroxyalkyl $G_{13}$ is, in particular, 2-hydroxyethyl or 2-hydroxypropyl.

$C_1$–$C_{18}$alkanoyl $G_{13}$ is, for example, formyl, acetyl, propionyl, butyryl, octanoyl, dodecanoyl, hexadecanoyl, octadecanoyl, but preferably acetyl, and $C_3$–$C_5$alkenoyl $G_{13}$ is, in particular, acryloyl.

$C_2$–$C_8$alkenyl $G_{14}$ is, for example, allyl, methallyl, 2-butenyl, 2-pentenyl, 2-hexenyl or 2-octenyl.

$G_{14}$ as a hydroxyl-, cyano-, alkoxycarbonyl- or carbamide-substituted $C_1$–$C_4$alkyl can be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$–$C_{12}$alkylene radicals are, for example, ethylene, propylene, 2,2-dimethylpropylene, tetramethylene, hexamethylene, octamethylene, decamethylene or dodecamethylene.

Any $C_6$–$C_{15}$arylene substituents are, for example, o-, m- or p-phenylene, 1,4-naphthylene or 4,4'-diphenylene.

$C_6$–$C_{12}$cycloalkylene is, in particular, cyclohexylene.

$G_{14}$ as 1-oxo-$C_2$–$C_{12}$alkylene is preferably a group

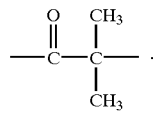

Preference is given to compounds of the formula (Ib) in which $n_2$ is 1 or 2, G and $G_1$ are hydrogen, $G_{11}$ is hydrogen or methyl, $G_{13}$ is hydrogen, $C_1$–$C_{12}$alkyl or a group of the formula

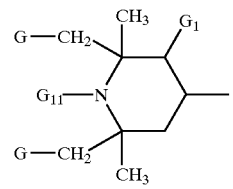

and $G_{14}$, in the case where n=1, is hydrogen or $C_1$–$C_{12}$alkyl, and, in the case where n=2, is $C_2$–$C_8$alkylene or 1-oxo-$C_2$–$C_8$alkylene.

Examples of polyalkylpiperidine compounds from this class are the following compounds:

37) N,N'-bis(2,2,6,6-tetramethylpiperidin-4-yl) hexamethylene-1,6-diamine
38) N,N'-bis(2,2,6,6-tetramethylpiperidin-4-yl) hexamethylene-1,6-diacetamide
39) bis(2,2,6,6-tetramethylpipeidin-4-yl)amine
40) 4-benzoylamino-2,2,6,6-tetramethylpiperidine
41) N,N'-bis(2,2,6,6-tetramethylpiperidin-4-yl)-N,N'-dibutyladipamide
42) N,N'-bis(2,2,6,6-tetramethylpiperidin-4-yl)-N,N'-dicyclohexyl-2-hydroxypropylene-1,3-diamine
43) N,N'-bis(2,2,6,6-tetramethylpiperidin-4-yl)-p-xylylenediamine
44) N,N'-bis(2,2,6,6-tetramethylpiperidin-4-yl)succinamide
45) bis(2,2,6,6-tetramethylpiperidin-4-yl)N-(2,2,6,6-tetramethylpiperidin-4-yl)-β-aminodipropionate 46) The compound of the formula

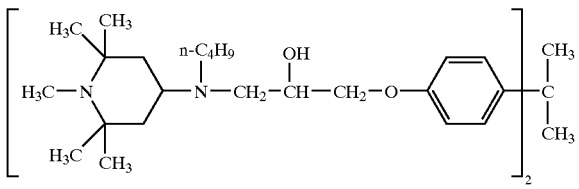

47) 4-(bis-2-hydroxyethylamino)-1,2,2,6,6-pentamethylpiperidine
48) 4-(3-methyl-4-hydroxy-5-tert-butyl-benzamido)-2,2,6,6-tetramethylpiperidine
49) 4-methacrylamido-1,2,2,6,6-pentamethylpiperidine 49-a)

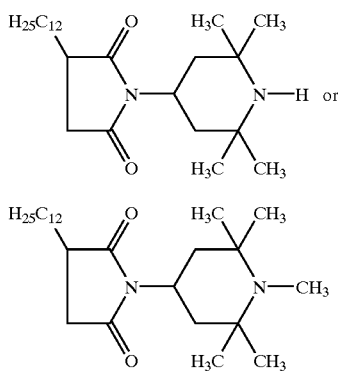

49-b) N,N',N''-tris[2,2,6,6-tetramethylpiperidin-4-ylamino (2-hydroxypropylene)]isocyanurate
49-c) 2-(2,2,6,6-tetramethylpiperidin-4-ylamino)-2-(2,2,6,6-tetramethylpiperidin-4-ylaminocarbonyl)porpane
49-d) 1,6-bis[N-(2,2,6,6-tetramethylpiperidin-4-yl)formylamino]hexane 49-e)

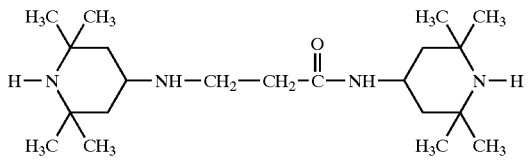

(c') A compound of the formula (Ic)

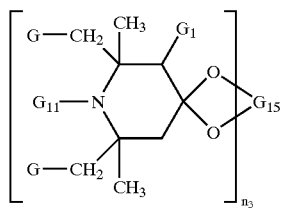

in which $n_3$ is the number 1 or 2, G, $G_1$ and $G_{11}$ are as defined under (a'), and $G_{15}$, if $n_3$ is 1, is $C_2$–$C_8$alkylene, $C_2$–$C_8$hydroxyalkylene or $C_4$–$C_{22}$acyloxyalkylene, and if $n_3$ is 2, $G_{15}$ is the $(-CH_2)_2C(CH_2-)_2$ group.

$C_2$–$C_8$alkylene or $C_2$–$C_8$hydroxyalkylene $G_{15}$ is, for example, ethylene, 1-methylethylene, propylene, 2-ethylpropylene or 2-ethyl-2-hydroxymethylpropylene.

$C_4$–$C_{22}$acyloxyalkylene $G_{15}$ is, for example, 2-ethyl-2-acetoxymethylpropylene.

Examples of polyalkylpiperidine compounds from this class are the following compounds:
50) 9-aza-8,8,10,10-tetramethyl-1,5-dioxaspiro[5.5]undecane
51) 9-aza-8,8,10,10-tetramethyl-3-ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl-1,5-dioxaspiro[5.5]un-decane
54) 9-aza-3-ethyl-3-acetoxymethyl-9-acetyl-8,8,10,10-tetramethyl-1,5-dioxaspiro[5.5]-undecane
55) 2,2,6,6-tetramethylpiperidine-4-spiro-2'-(1',3'-dioxane)-5'-spiro-5"-(1", 3"-dioxane)-2"-spiro-4'''-(2''',2''',6''',6'''-tetramethylpiperidine)

(d') A compound of the formula (Id-1), (Id-2) or (Id-3),

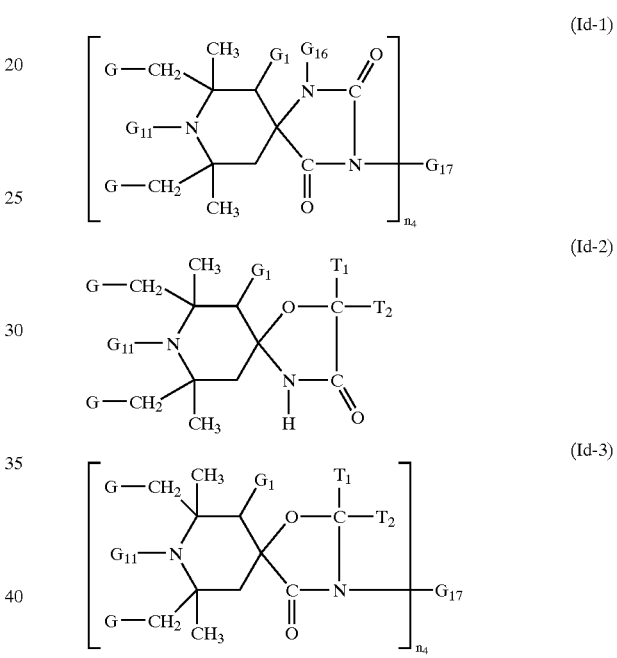

in which $n_4$ is the number 1 or 2, G, $G_1$ and $G_{11}$ are as defined under (a'), $G_{16}$ is hydrogen, $C_1$–$C_{12}$alkyl, allyl, benzyl, glycidyl or $C_2$–$C_6$alkoxyalkyl, and $G_{17}$, if $n_4$ is 1, is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of the formula $-(CH_2)_p-$COO-Q or $-(CH_2)_p-$O-CO-Q, in which p is 1 or 2, and Q is $C_1$–$C_4$alkyl or phenyl, and $G_{17}$, if n is 2, is $C_2$–$C_{12}$alkylene, $C_4$–$C_{12}$alkenylene, $C_6$–$C_{12}$arylene, a group of the formula $-CH_2-CH(OH)-CH_2-O-D'-O-CH_2-CH(OH)-CH_2-$, in which D' is $C_2$–$C_{10}$alkylene, $C_6$–$C_{15}$arylene, $C_6$–$C_{12}$cycloalkylene or a group of the formula $-CH_2CH(OD'')CH_2-(OCH_2-CH(OD'')CH_2)_2-$, in which D'' is hydrogen, $C_1$–$C_{18}$alkyl, allyl, benzyl, $C_2$–$C_{12}$alkanoyl or benzoyl, $T_1$ and $T_2$, independently of one another, are hydrogen, $C_1$–$C_{18}$alkyl or unsubstituted or halogen- or $C_1$–$C_4$alkyl-substituted $C_6$–$C_{10}$aryl or $C_7$–$C_9$aralkyl, or $T_1$ and $T_2$ together with the carbon atom bonding them form a $C_5$–$C_{14}$cycloalkane ring.

A compound of the formula (Id-3) is preferred.

Some examples of the several variables in the formulae (Id-1), (Id-2) and (Id-3) are given below.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_{18}$alkyl substituents can be, for example, the abovementioned groups and in addition, for example, n-tridecyl, n-tetradecyl, n-hexadecyl or n-octadecyl.

Any $C_2$–$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$C_3$–$C_5$alkenyl $G_{17}$ is, for example, 1-propenyl, allyl, methallyl, 2-butenyl or 2-pentenyl.

$C_7$–$C_9$aralkyl $G_{17}$, $T_1$ and $T_2$ are, in particular, phenethyl or especially benzyl. If $T_1$ and $T_2$ together with the carbon atom form a cycloalkane ring, this can be, for example, a cyclo-pentane, cyclohexane, cyclooctane or cyclododecane ring.

$C_2$–$C_4$hydroxyalkyl $G_{17}$ is, for example, 2-hydroxyethyl, 2-hydroxypropyl, 2-hydroxybutyl or 4-hydroxybutyl.

$C_6$–$C_{10}$aryl $G_{17}$, $T_1$ and $T_2$ are, in particular, phenyl or α- or β-naphthyl, which are unsubstituted or substituted by halogen or $C_1$–$C_4$alkyl.

$C_2$–$C_{12}$alkylene $G_{17}$ is, for example, ethylene, propylene, 2,2-dimethylpropylene, tetramethylene, hexamethylene, octamethylene, decamethylene or dodecamethylene.

$C_4$–$C_{12}$alkenylene $G_{17}$ is, in particular, 2-butenylene, 2-pentenylene or 3-hexenylene.

$C_6$–$C_{12}$arylene $G_{17}$ is, for example, o-, m- or p-phenylene, 1,4-naphthylene or 4,4'-diphenylene.

$C_2$–$C_{12}$alkanoyl D" is, for example, propionyl, butyryl, octanoyl, dodecanoyl, but preferably acetyl.

$C_2$–$C_{10}$alkylene, $C_6$–$C_{15}$arylene or $C_6$–$C_{12}$cycloalkylene D' have, for example, one of the definitions given for D under (b').

Examples of polyalkylpiperidine compounds from this class are the following compounds:

56) 3-benzyl-1,3,8-triaza-7,7,9,9-tetramethylspiro[4.5]decane-2,4-dione
57) 3-n-octyl-1,3,8-triaza-7,7,9,9-tetramethylspiro[4.5]decane-2,4-dione
58) 3-allyl-1,3,8-triaza-1,7,7,9,9-pentamethylspiro[4.5]decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxospiro[4.5]decane
62) 2,2-dibutyl-7,7,9,9-tetramethyl-1-oxa-3,8-diaza-4-oxospiro[4.5]decane
63) 2,2,4,4-tetramethyl-7-oxa-3,20-diaza-21-oxodispiro[5.1.11.2]heneicosane
64) 2-butyl-7,7,9,9-tetramethyl-1-oxa-4,8-diaza-3-oxospiro[4.5]decane and preferably:
65) 8-acetyl-3-dodecyl-1,3,8-triaza-7,7,9,9-tetramethylspiro[4.5]decane-2,4-dione and the compounds of the following formulae:

66)

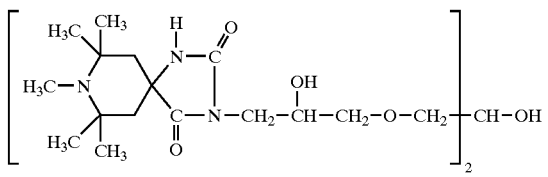

67)

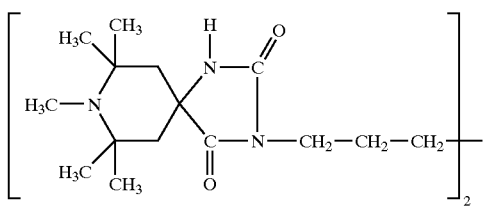

68)

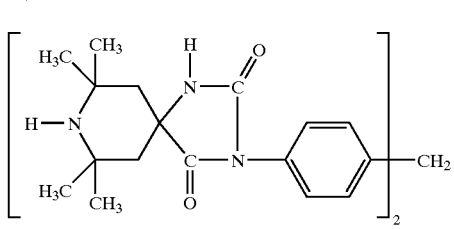

69-a)

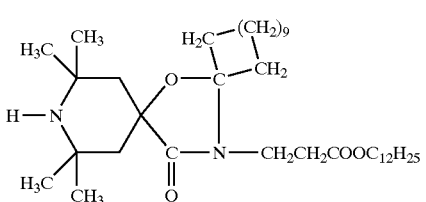

69-b) Mixture of 60% by weight of

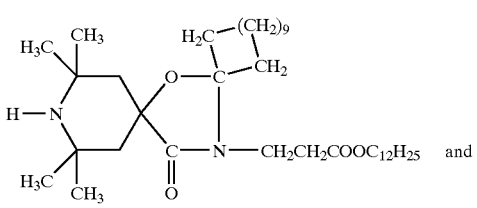

and

40% by weight of

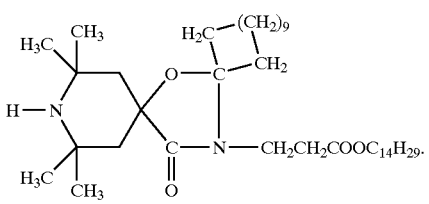

(e') A compound of the formula (Ie)

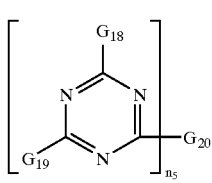

in which $n_5$ is the number 1 or 2, and $G_{18}$ is a group of the formula

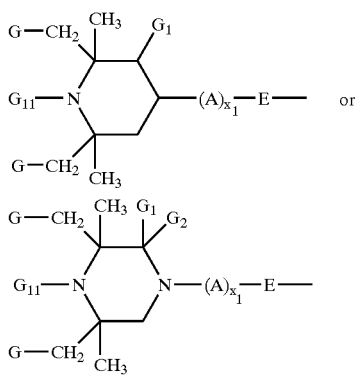

in which G and $G_{11}$ are as defined under (a'), and $G_1$ and $G_2$ are hydrogen, methyl or, together, are a substituent =O, E is —O— or —ND'''-, A is $C_2$–$C_6$alkylene or —(CH$_2$)$_3$—O— and $x_1$ is the number 0 or 1, D''' is hydrogen, $C_1$–$C_{12}$alkyl, $C_2$–$C_5$hydroxyalkyl or $C_5$–$C_7$cycloalkyl, $G_{19}$ is identical to $G_{18}$ or is one of the groups —N($G_{21}$)($G_{22}$), —OG$_{23}$, —N(H)(CH$_2$OG$_{23}$) or —N(CH$_2$OG$_{23}$)$_2$, $G_{20}$, if n=1, is identical to $G_{18}$ or $G_{19}$ and, if n=2, is an -E-D$^{IV}$-E- group, in which D$^{IV}$ is $C_2$–$C_8$alkylene or $C_2$–$C_8$alkylene which is interrupted by 1 or 2 —NG$_{21}$- groups, $G_{21}$ is $C_1$–$C_{12}$alkyl, cyclohexyl, benzyl or $C_1$–$C_4$-hydroxyalkyl or a group of the formula

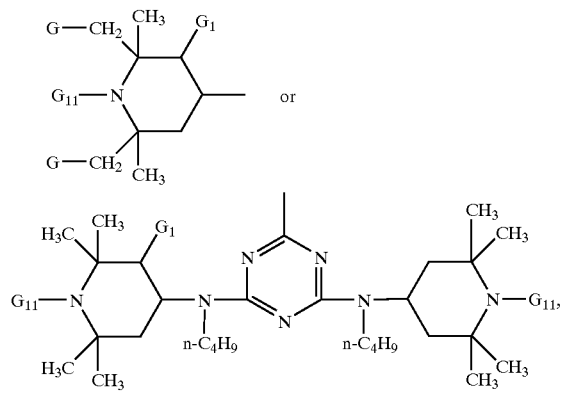

$G_{22}$ is $C_1$–$C_{12}$alkyl, cyclohexyl, benzyl or $C_1$–$C_4$hydroxyalkyl, and $G_{23}$ is hydrogen, $C_1$–$C_{12}$alkyl or phenyl, or $G_{21}$ and $G_{22}$ together are $C_4$–$C_5$alkylene or $C_4$–$C_5$oxaalkylene, for example —CH$_2$CH$_2$—O—CH$_2$CH$_2$—, or a group of the formula —CH$_2$CH$_2$—N(G$_{11}$)—CH$_2$CH$_2$—.

Some examples of the several variables in the formula (Ie) are given below.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any hydroxyalkyl substituents are, for example, 2-hydroxyethyl, 2-hydroxypropyl, 3-hydroxypropyl, 2-hydroxybutyl or 4-hydroxybutyl.

Any $C_5$–$C_7$cycloalkyl substituents are, for example, cyclopentyl, cyclohexyl or cycloheptyl. Cyclohexyl is preferred.

$C_2$–$C_6$alkylene A is, for example, ethylene, propylene, 2,2-dimethylpropylene, tetramethylene or hexamethylene.

If $G_{21}$ and $G_{22}$ together are $C_4$–$C_5$alkylene or oxaalkylene, they are, for example, tetramethy-lene, pentamethylene or 3-oxapentamethylene.

Examples of polyalkylpiperidine compounds from this class are the compounds of the following formulae:

70)

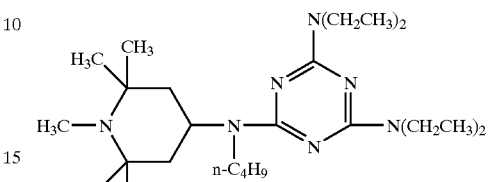

71)

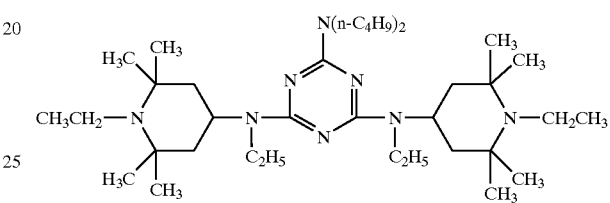

72)

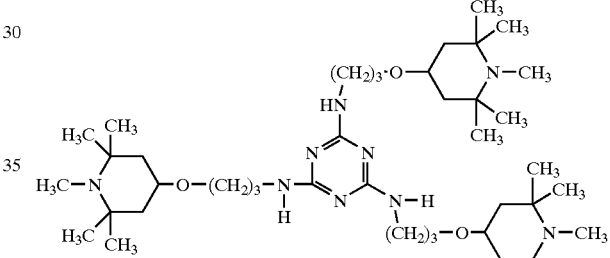

73)

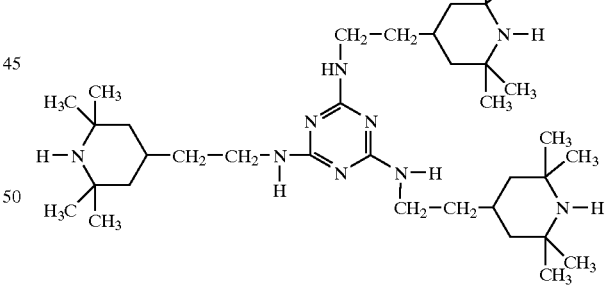

74)

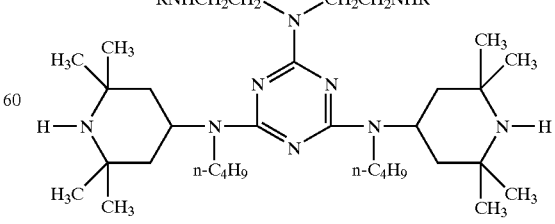

-continued where R is

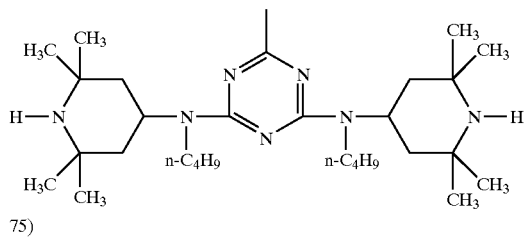
75)

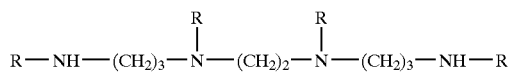

where R has the same meaning as in compound 74.

76)
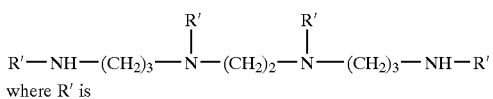
where R' is

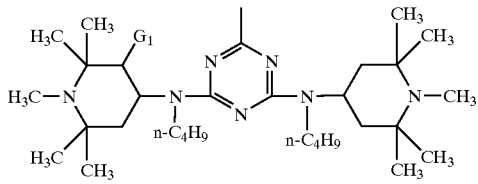
77)

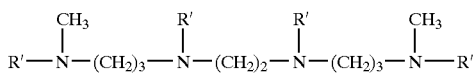

where R' has the same meaning as in compound 76.

78)
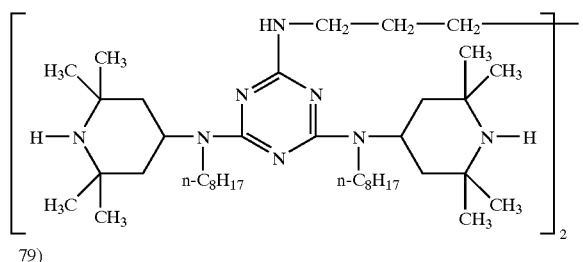

79)
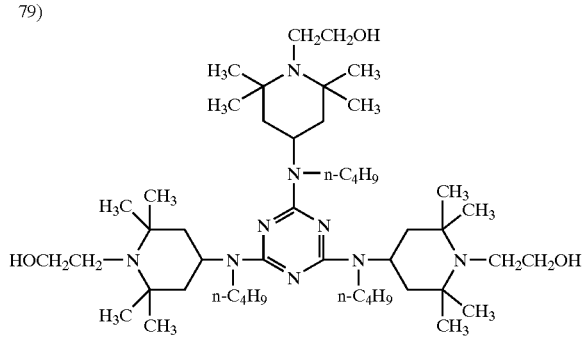

-continued

80)
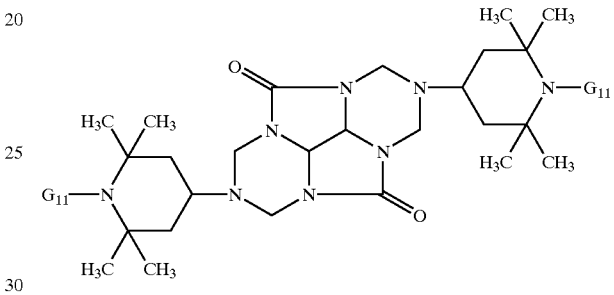

(f) A compound of the formula (If)

(If)
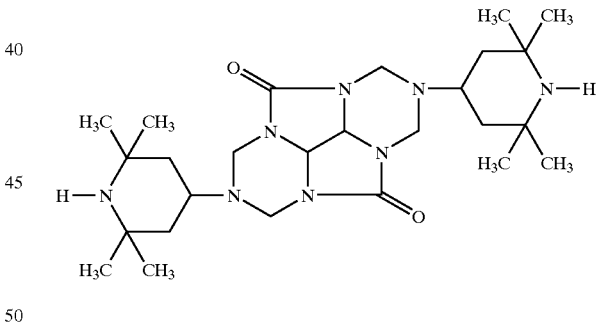

wherein $G_{11}$ is as defined under (a').

A preferred example from this class is the following compound:

80-a)

(g') Oligomeric or polymeric compounds whose recurring structural unit contains a 2,2,6,6-tetraalkylpiperidinyl radical, in particular polyesters, polyethers, polyamides, polyamines, polyurethanes, polyureas, polyaminotriazines, poly(meth)acrylates, poly(meth)acrylamides and copolymers thereof which contain such radicals.

Examples of 2,2,6,6-polyalkylpiperidine compounds from this class are the compounds of the following formulae, where $m_1$ to $m_{14}$ is a number from 2 to about 200, preferably 2 to 100, for example 2 to 50, 2 to 40 or 3 to 40 or 4 to 10.

The meanings of the end groups which saturate the free valences in the oligomeric or polymeric compounds listed below depend on the processes used for the preparation of said compounds. The end groups can also in addition be modified after the synthesis of the compounds.

81)

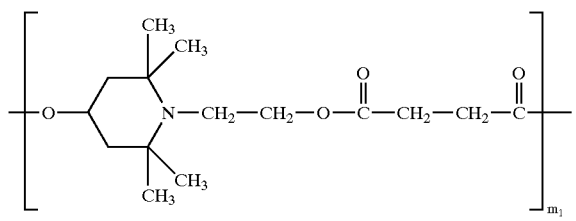

82)

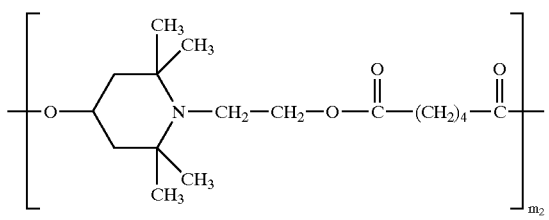

In the compounds 81 and 82, the end group bonded to the —O— can be, for example, hydrogen or a group —CO—(CH$_2$)$_2$—COO—Y or —CO—(CH$_2$)$_4$—COO—Y, respectively, with Y being hydrogen or C$_1$–C$_4$alkyl and the end group bonded to the diacyl can be, for example, —O—Y or a group

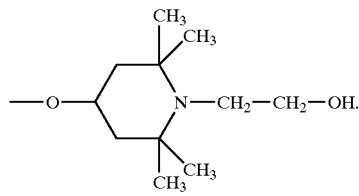

83)

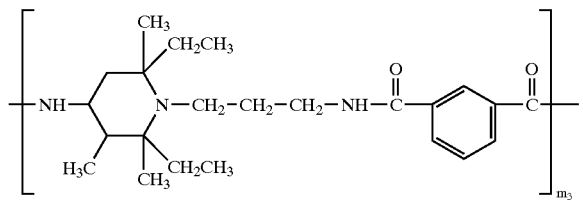

In the compound 83, the end group bonded to the amino residue can be, for example, a group

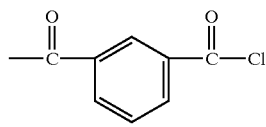

and the end group bonded to the diacyl residue can be, for example, Cl.

84-1)

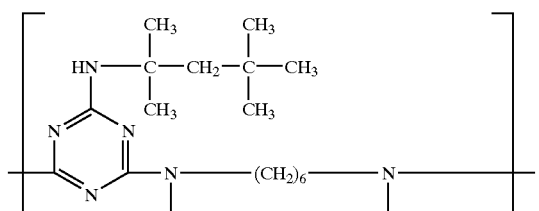

84-2)

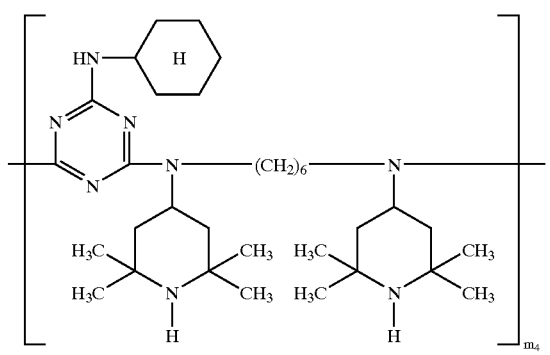

In the compounds 84-1 and 84-2, the end group bonded to the triazine residue can be, for example, chlorine or a group

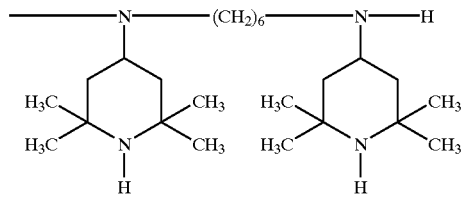

and the end group bonded to the diamino group can be, for example, hydrogen or a group

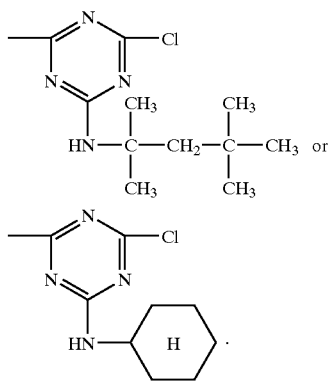

It may be convenient to replace the chlorine attached to the triazine by e.g. —OH or an amino group. Suitable amino groups are typically: pyrrolidin-1-yl, morpholino, —NH$_2$, —N(C$_1$–C$_8$alkyl)$_2$ and —NY'(C$_1$–C$_8$alkyl) wherein Y' is hydrogen or a group of the formula

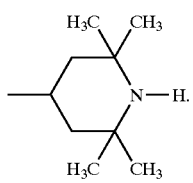

85)

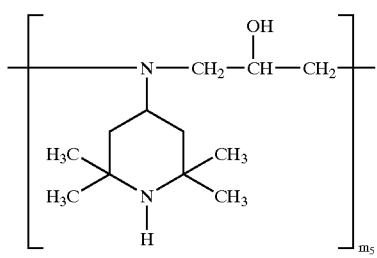

In the compound 85, the end group bonded to the 2,2,6, 6-tetramethylpiperidin-4-ylamino residue can be, for example, hydrogen and the end group bonded to the 2-hydroxypropylene residue can be, for example,

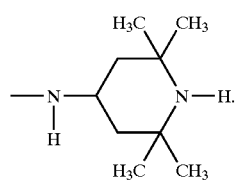

86)

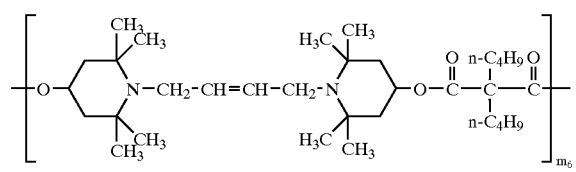

In the compound 86, the end group bonded to the —O— can be, for example, hydrogen or

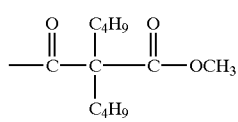

and the end group bonded to the diacyl residue can be, for example, —OCH$_3$ or Cl.

87)

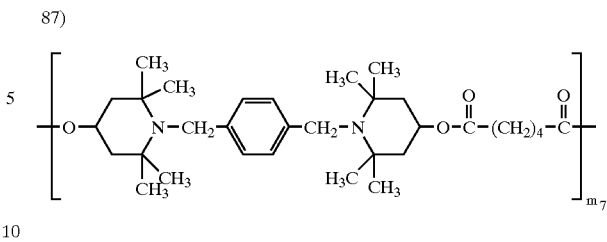

In the compound 87, the end group bonded to the —O— can be, for example, hydrogen or

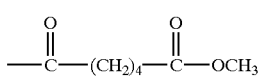

and the end group bonded to the diacyl radical can be, for example, —OCH$_3$ or Cl.

88)

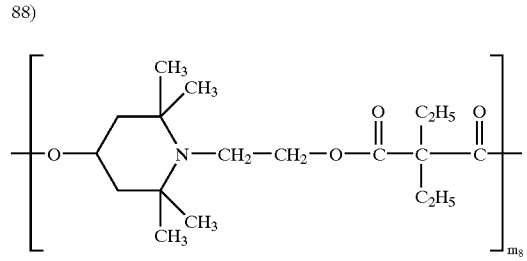

In the compound 88, the end group bonded to the —O— can be, for example, hydrogen or

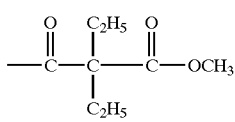

and the end group bonded to the diacyl radical can be, for example, —OCH$_3$ or Cl.

89)

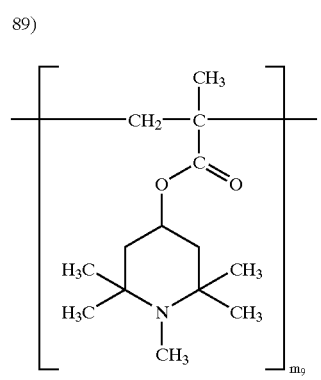

In the compound 89, the end group bonded to the —CH$_2$— can be, for example, hydrogen and the end group bonded to the ester residue can be, for example,

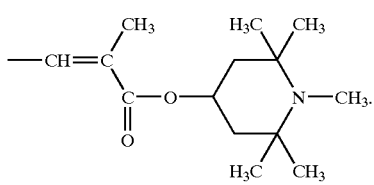

90)

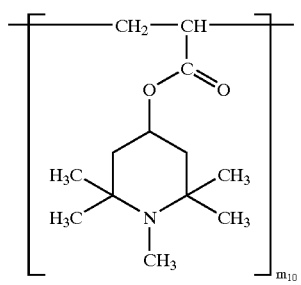

In the compound 90, the end group bonded to the —CH$_2$— can be, for example, hydrogen and the end group bonded to the ester residue can be, for example,

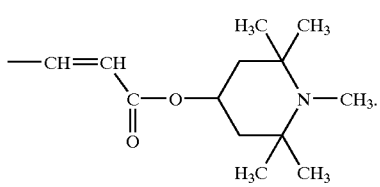

91)

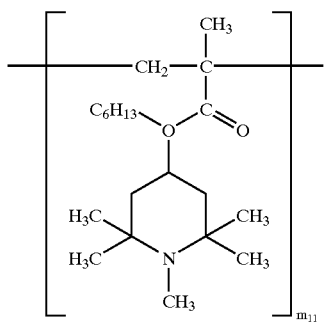

In the compound 91, the end group bonded to the —CH$_2$— can be, for example, hydrogen and the end group bonded to the amide residue can be, for example,

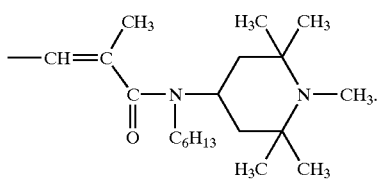

92)

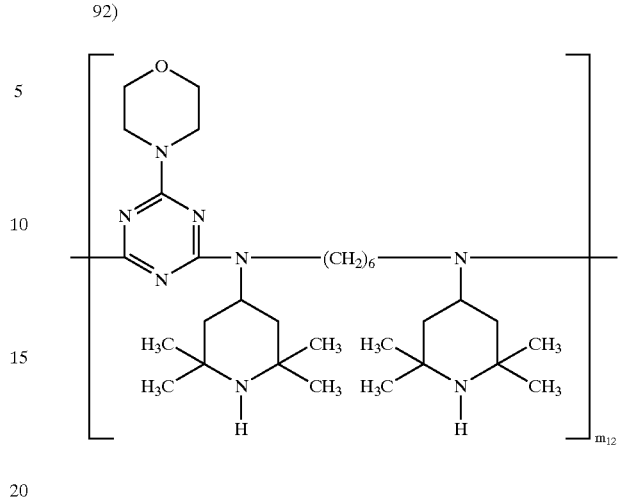

In the compound 92, the end group bonded to the triazine residue can be, for example, chlorine or a group

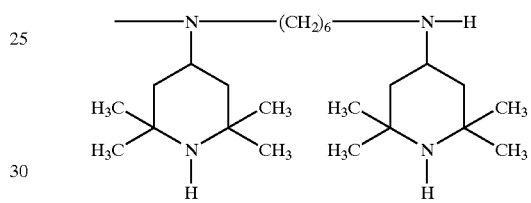

and the end group bonded to the diamino residue can be, for example, hydrogen or a group

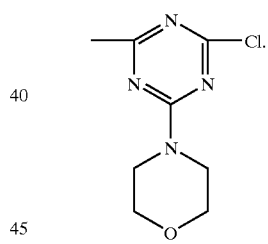

It may be convenient to replace the chlorine attached to the triazine by e.g. —OH or an amino group. Suitable amino groups are typically: pyrrolidin-1-yl, morpholino, —NH$_2$, —N(C$_1$–C$_8$alkyl)$_2$ and —NY'(C$_1$–C$_8$alkyl) wherein Y' is hydrogen or a group of the formula

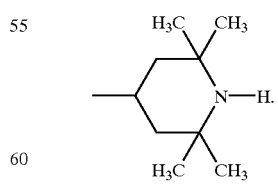

Preferred is also a compound which corresponds to compound 92 wherein the 2,2,6,6-tetramethyl-4-piperidyl groups are replaced by 1,2,2,6,6-pentamethyl-4-piperidyl groups.

93)

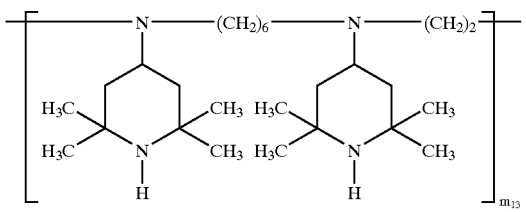

In the compound 93, the end group bonded to the diamino residue can be, for example, hydrogen and the end group bonded to the —CH₂CH₂— residue can be, for example,

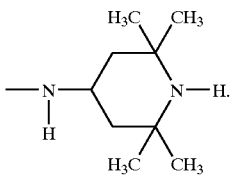

94)

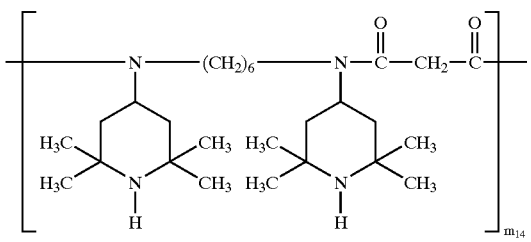

In the compound 94, the end group bonded to the diamino residue can be, for example, hydrogen and the end group bonded to the diacyl residue can be, for example, Cl.

95)

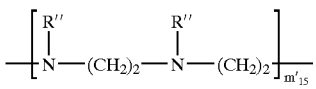

in which R'' is a group of the formula (95-I)

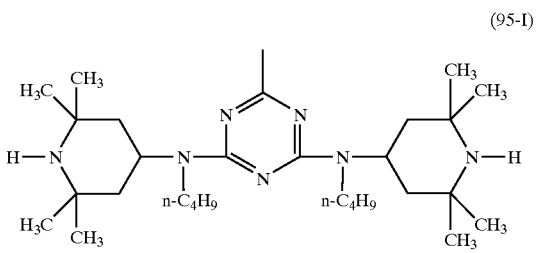

or the chain branching

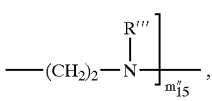

R''' is a group of the formula (95-I), and $m'_{15}$ and $m''_{15}$ are each a number from 0 to 200, preferably 0 to 100, in particular 0 to 50, with the proviso that $m'_{15}+m''_{15}$ is a number from 2 to 200, preferably 2 to 100, in particular 2 to 50. In the compound 95, the end group bonded to the diamino residue can be, for example, hydrogen and the end group bonded to the —CH₂CH₂— group can be, for example, halogen, in particular Cl or Br. Further examples for polymeric compounds are:

1) A compound of the formula (96-I) or (96-II)

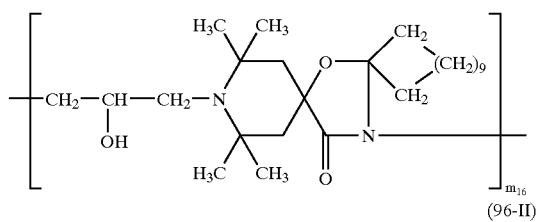

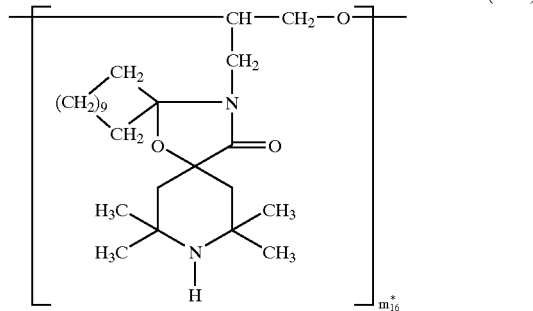

wherein $m_{16}$ and $m_{16}^*$ are a number from 2 to 50.

During the preparation, the compounds of the formulae (96-I) and (96-II) can be obtained together as a mixture and therefore, can also be employed as such. The (96-I):(96-II) weight ratio is, for example, from 20:1 to 1:20 or from 1:10 to 10:1.

In the compounds of the formula (96-I), the terminal group bonded to the nitrogen can be, for example, hydrogen and the terminal group bonded to the 2-hydroxypropylene radical can be, for example, a

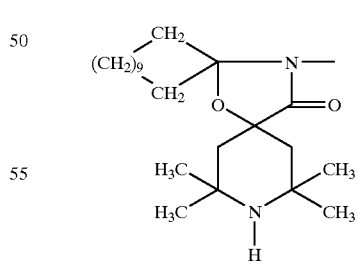

group.

In the compounds of the formula (96-II), the terminal group bonded to the dimethylene radical can be, for example, —OH, and the terminal group bonded to the oxygen can be, for example, hydrogen. The terminal groups can also be polyether radicals.

2) A compound of the formula (97)

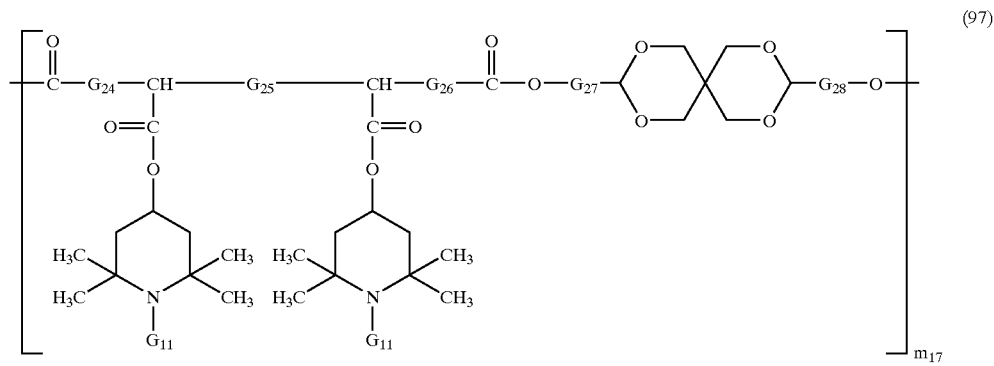

wherein $G_{24}$, $G_{25}$, $G_{26}$, $G_{27}$ and $G_{28}$, independently of one another, are a direct bond or $C_1$–$C_{10}$alkylene, $G_{11}$ is as defined under (a') and $m_{17}$ is a number from 1 to 50.

In the compound of the formula (97), the end group bonded to the >C=O group can be, for example,

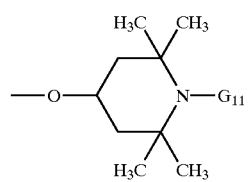

and the end group bonded to the oxygen can be, for example

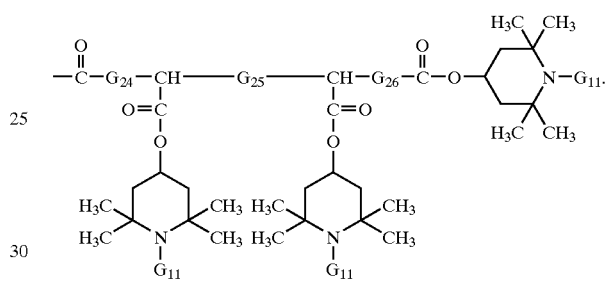

Preferred are the following two compounds:

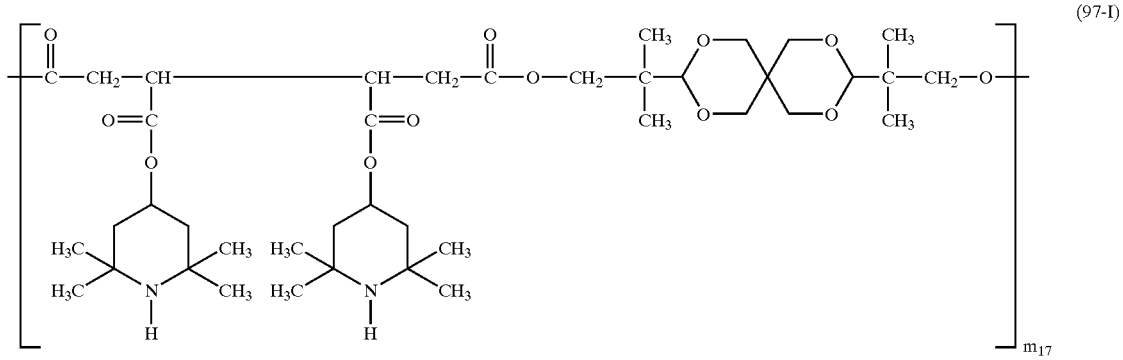

and

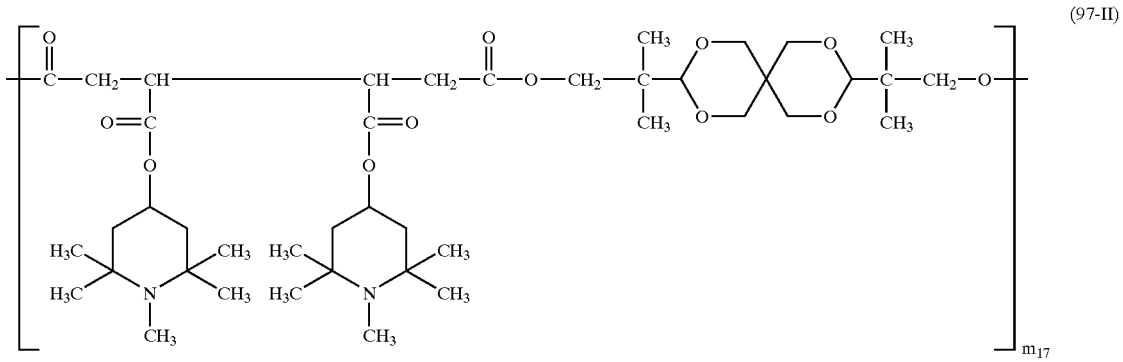

wherein the mean value of $m_{17}$ is 2.5.

3) A compound of the formula (98)

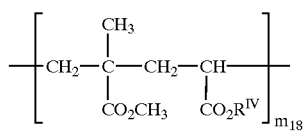
(98)

in which approximately one third of the radicals $R^{IV}$ are $-C_2H_5$ and the others are a group

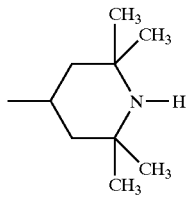

and $m_{18}$ is a number in the range from 2 to 200, preferably 2 to 100, in particular 2 to 50.

In the compound (98), the end group bonded to the $-CH_2-$ residue can be, for example, hydrogen and the end group bonded to the $-CH(CO_2R^{IV})-$ residue can be, for example, $-CH=CH-COOR^{IV}$.

4) A compound of the formula (99)

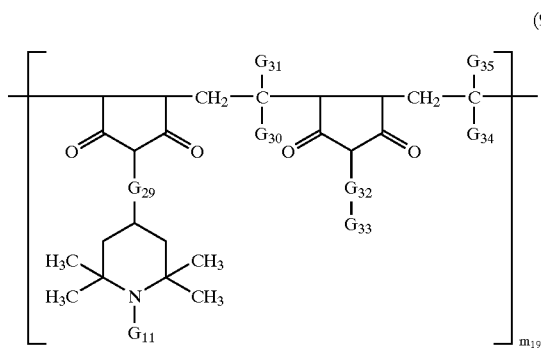
(99)

in which $G_{11}$ is as defined under (a'), $G_{29}$ and $G_{32}$, independently of one another, are a direct bond or a $-N(X_1)-CO-X_2-CO-N(X_3)-$ group, where $X_1$ and $X_3$, independently of one another, are hydrogen, $C_1-C_8$alkyl, $C_5-C_{12}$cycloalkyl, phenyl, $C_7-C_9$phenylalkyl or a group of the formula (99-1)

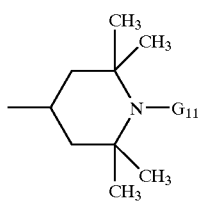
(99-1)

and $X_2$ is a direct bond or $C_1-C_4$alkylene, $G_{30}$, $G_{31}$, $G_{34}$ and $G_{35}$, independently of one another, are hydrogen, $C_1-C_{30}$alkyl, $C_5-C_{12}$cycloalkyl or phenyl, $G_{33}$ is hydrogen, $C_1-C_{30}$alkyl, $C_5-C_{12}$cycloalkyl, $C_7-C_9$phenylalkyl, phenyl or a group of the formula (99-1), and $m_{19}$ is a number from 1 to 50.

In the compounds of the formula (99), the end group bonded to the 2,5-dioxopyrrolidine ring can be, for example, hydrogen, and the end group bonded to the $-C(G_{34})(G_{35})$-radical can be, for example,

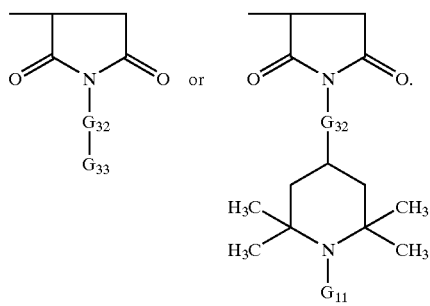

Examples of the compounds of the formula (99) are:

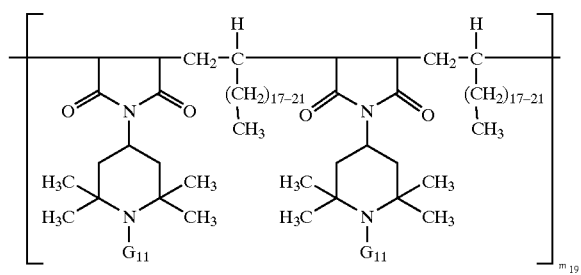
(99-I)

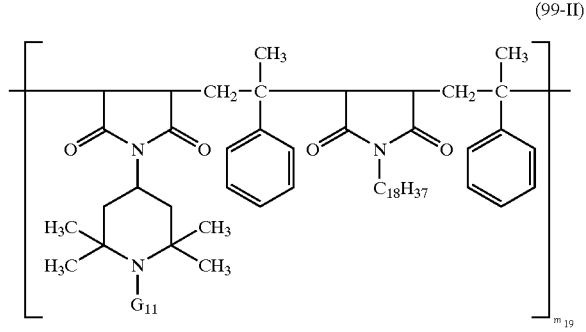
(99-II)

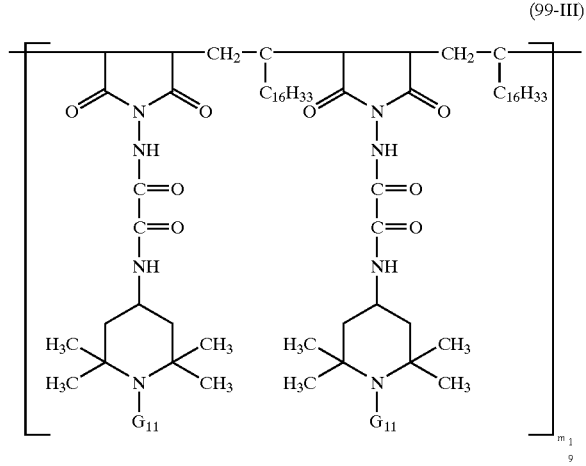
(99-III)

wherein $G_{11}$ is hydrogen or methyl, and $m_{19}$ is a number from 1 to 25.

5) A product obtainable by reacting an intermediate product, obtained by reaction of a polyamine of the formula (100a) with cyanuric chloride, with a compound of the formula (100b)

$$H_2N-(CH_2)_{m'_{20}}-NH-(CH_2)_{m''_{20}}-NH-(CH_2)_{m'''_{20}}-NH_2 \qquad (100a)$$

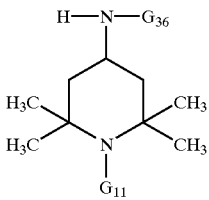
(100b)

in which $m'_{20}$, $m''_{20}$ and $m'''_{20}$, independently of one another, are a number from 2 to 12, $G_{36}$ is hydrogen, $C_1$–$C_{12}$alkyl, $C_5$–$C_{12}$cycloalkyl, phenyl or $C_7$–$C_9$phenylalkyl, and $G_{11}$ is as defined under (a'). A preferred product has the Chemical Abstracts-CAS No. 136 504-96-6 (Compound 100-A).

In general, the above reaction product can be represented for example by a compound of the formula 100-1, 100-2 or 100-3. It can also be in the form of a mixture of these three compounds.

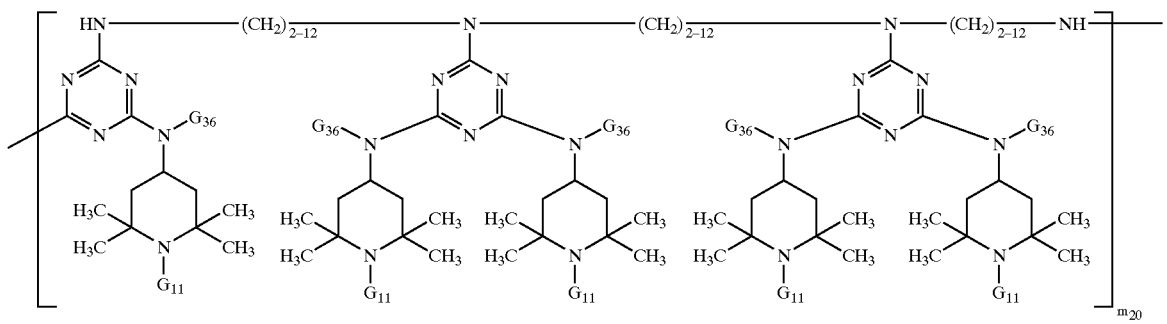
(100-1)

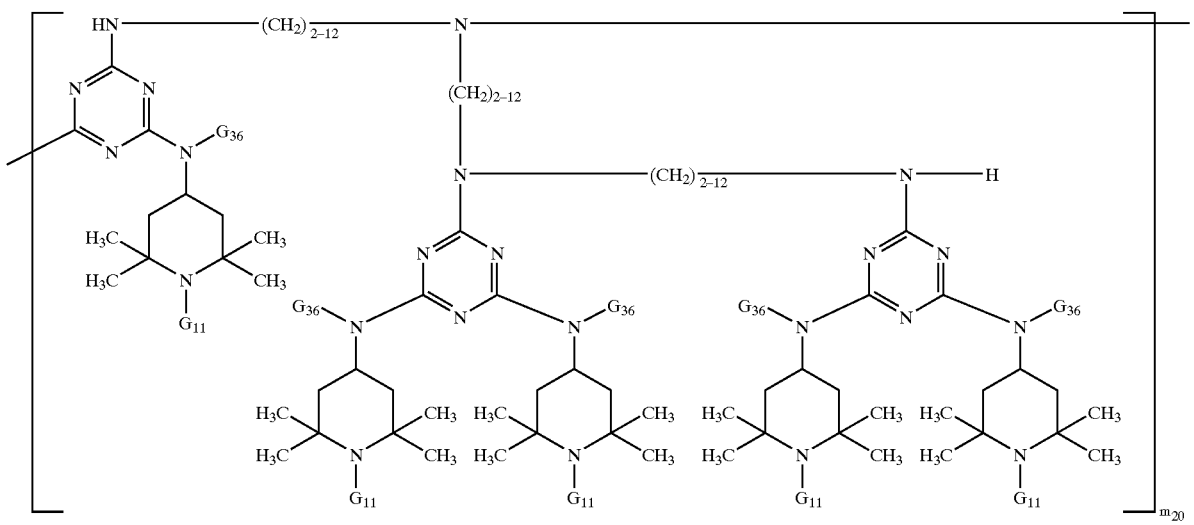
(100-2)

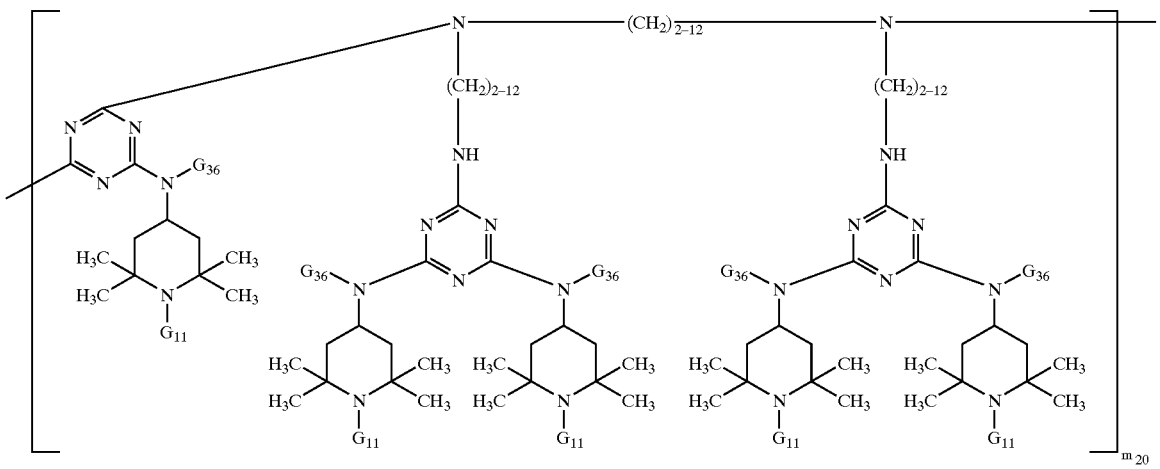
A preferred meaning of the formula (100-1) is
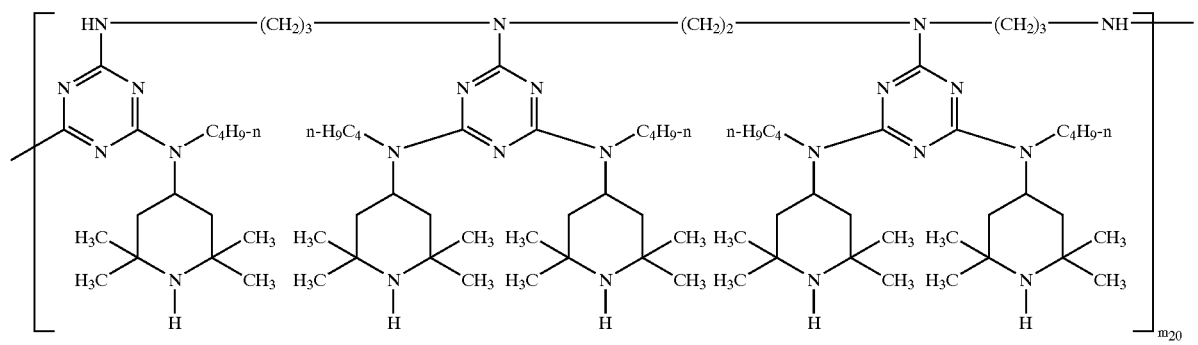
A preferred meaning of the formula (100-2) is
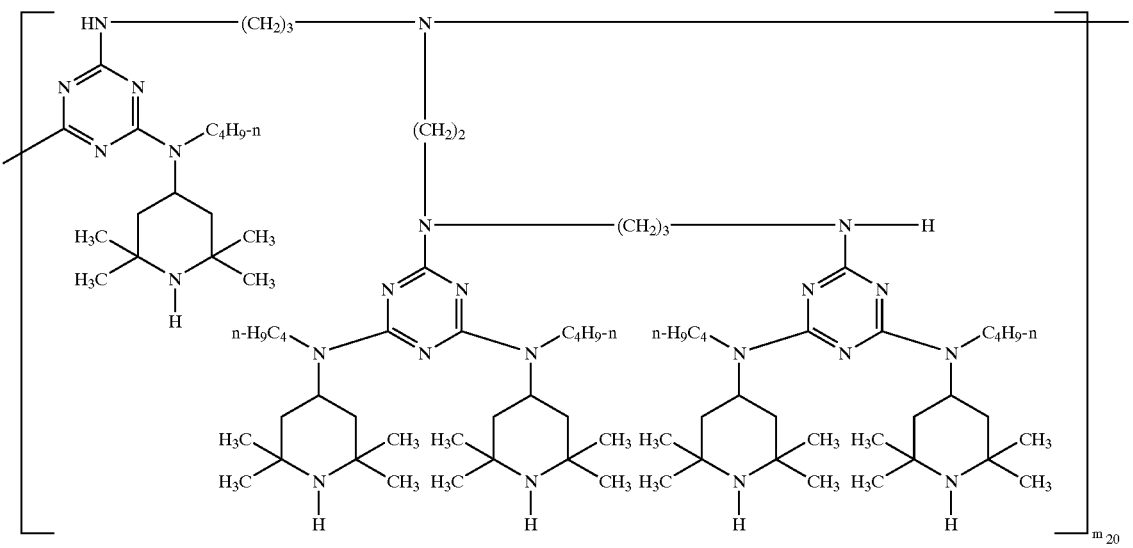

A preferred meaning of the formula (100-3) is

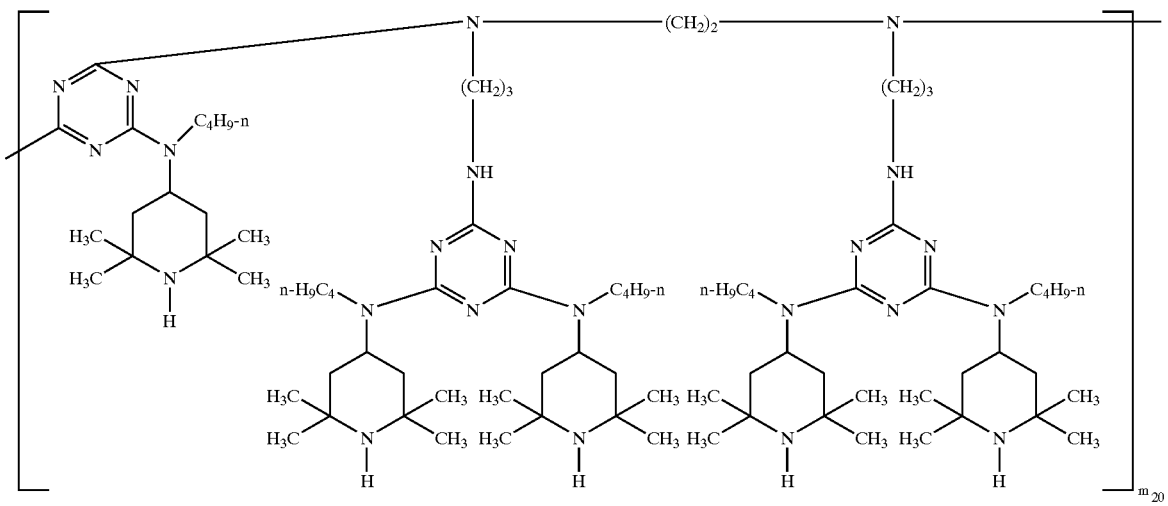

In the above formulae 100-1 to 100-3, $m_{20}$ is preferably 1 to 20.

6) A compound of the formula (101)

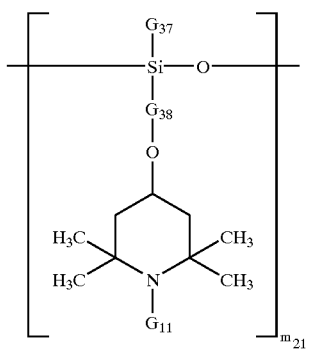

(101)

in which $G_{11}$ is as defined under (a'), $G_{37}$ is $C_1$–$C_{10}$alkyl, $C_5$–$C_{12}$cycloalkyl, $C_1$–$C_4$alkyl-substituted $C_5$–$C_{12}$cycloalkyl, phenyl or $C_1$–$C_{10}$alkyl-substituted phenyl, $G_{38}$ is $C_3$–$C_{10}$alkyle and $m_{21}$ is a number from 1 to 50.

In the compounds of the formula (101), the terminal group bonded to the silicon atom can be, for example, $(G_{37})_3Si$—O—, and the terminal group bonded to the oxygen can be, for example, —Si$(G_{37})_3$.

The compounds of the formula (101) can also be in the form of cyclic compounds if $m_{21}$ is a number from 3 to 10, i.e. the free valences shown in the structural formula then form a direct bond.

An example of a compound of the formula (101) is

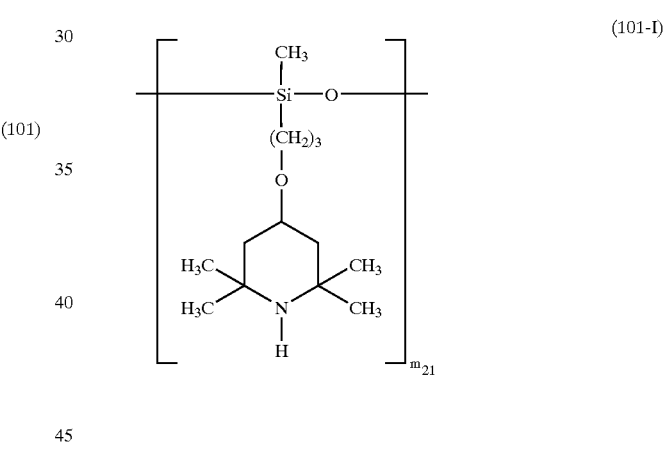

(101-I)

with $m_{21}$ being a number from 1 to 20.

In the above shown oligomeric and polymeric compounds, examples of alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethyl-hexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl and docosyl; examples of cycloalkyl are cyclopentyl, cyclohexyl, cycloheptyl and cyclooctyl; an example of $C_7$–$C_9$phenylalkyl is benzyl; and examples of alkylene are ethylene, propylene, trimethylene, tetramethylene, pentamethylene, 2,2-dimethyltrimethylene, hexamethylene, trimethylhexamethylene, octamethylene and decamethylene.

(h') A compound of the formula (Ih)

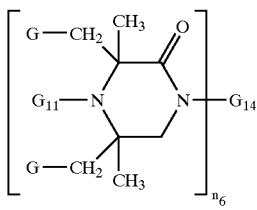
(Ih)

in which $n_6$ is the number 1 or 2, G and $G_{11}$ are as defined under (a'), and $G_{14}$ is as defined under (b'), but $G_{14}$ cannot be —CONH-Z and —$CH_2$—CH(OH)—$CH_2$—O-D-O—.

Examples of such compounds are the following:

102)

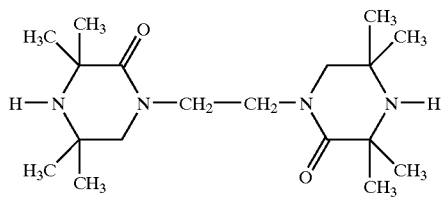

103)

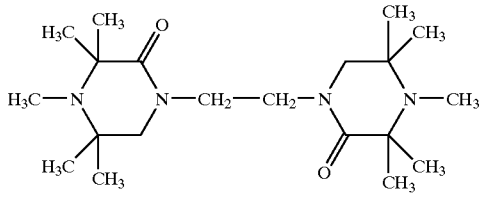

104)

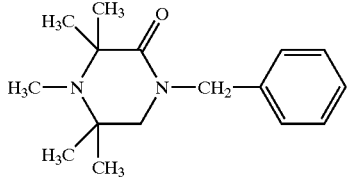

(i') A compound of the formula (Ii)

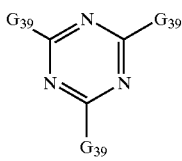
(Ii)

wherein the radicals $G_{39}$, independently of one another, are a group of the formula (Ii-1)

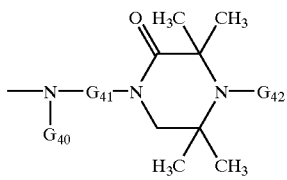
(Ii-1)

in which $G_{40}$ is $C_1$–$C_{12}$alkyl or $C_5$–$C_{12}$cycloalkyl, $G_{41}$ is $C_2$–$C_{12}$alkylene and $G_{42}$ is hydrogen, $C_1$–$C_8$alkyl, —O, —$CH_2CN$, $C_3$–$C_6$alkenyl, $C_7$–$C_9$phenylalkyl, $C_7$–$C_9$phenylalkyl which is substituted on the phenyl radical by $C_1$–$C_4$alkyl; or $C_1$–$C_8$acyl.

Alkyl is for example $C_1$–$C_4$alkyl, in particular methyl, ethyl, propyl or butyl.

Cycloalkyl is preferably cyclohexyl.

Alkylene is for example ethylene, propylene, trimethylene, tetramethylene, pentamethylene, 2,2-dimethyltrimethylene or hexamethylene.

Alkenyl is preferably allyl.

Phenylalkyl is preferably benzyl.

Acyl is preferably acetyl.

Examples of compounds from this class are the compounds of the following formulae:

105)

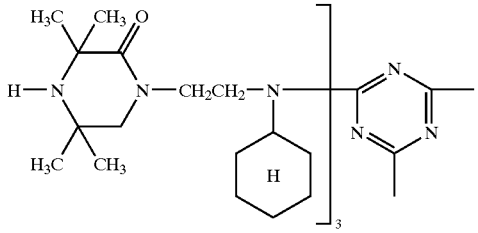

106)

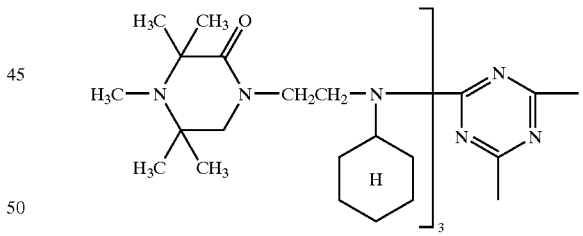

The sterically hindered amine compound (component (A)) is preferably one of the above compounds 1 to 106. The compounds 5, 10, 13, 14, 24, 25, 36-a, 36-b, 36-d, 49-a–I, 49-e, 63, 75, 76, 80-a, 81, 84-1, 84-2, 92, 93, 96-I, 96-II, 97-I, 97-II, 99-I, 100-A, 101-I, 105 and 106 are of interest. The compounds 13, 14, 36-a, 36-b, 36-d, 76, 81, 84-1, 96-I, 96-II, 100-A, 101-I, 105 and 106 are preferred. The compounds 13, 14, 36-d, 81, 84-1, 96-I, 96-II, 100-A, 101-I, 105 and 106 are particularly preferred.

Examples of an organic salt of Ca are Ca-stearate, Ca-laurate, Ca-lactate and Ca-stearoyl-lactate.

Examples of an inorganic salt of Ca are CaO and Ca(OH)$_2$.

The organic salt of zinc or magnesium defined in component (C) is preferably a compound of the formula MeL$_2$ in which Me is zinc or magnesium and L is an anion of an organic acid or of an enol. The organic acid can, for example, be a sulfonic acid, sulfinic acid, phosphonic acid or phosphinic acid, but is preferably a carboxylic acid. The acid can be aliphatic, aromatic, araliphatic or cycloaliphatic; it can be linear or branched; it can be substituted by hydroxyl or alkoxy groups; it can be saturated or unsaturated and it preferably contains 1 to 24 carbon atoms.

Examples of carboxylic acids of this type are formic, acetic, propionic, butyric, isobutyric, caprioic, 2-ethylcaproic, caprylic, capric, lauric, palmitic, stearic, behenic, oleic, lactic, ricinoleic, 2-ethoxypropionic, benzoic, salicylic, 4-butylbenzoic, toluic, 4-dodecylbenzoic, phenylacetic, naphthylacetic, cyclohexanecarboxylic, 4-butylcyclohexanecarboxylic or cyclohexylacetic acid. The carboxylic acid can also be a technical mixture of carboxylic acids, for example technical mixtures of fatty acids or mixtures of alkylated benzoic acids.

Examples of organic acids containing sulfur or phosphorus are methanesulfonic, ethanesulfonic, α,α-dimethylethanesulfonic, n-butanesulfonic, n-dodecanesulfonic, benzenesulfonic, toluenesulfonic, 4-nonylbenzenesulfonic, 4-dodecylbenzenesulfonic or cyclohexanesulfonic acid, dodecanesulfinic, benzenesulfinic-or naphthalenesulfinic acid, butylphosphonic acid, phenylphosphonic acid, monomethyl or monoethyl phenylphosphonate, monobutyl benzylphosphonate, dibutylphosphinic acid or diphenylphosphinic acid.

If L is an enolate anion, it is preferably an anion of a β-dicarbonyl compound or of an o-acylphenol. Examples of β-dicarbonyl compounds are acetylacetone, benzoylacetone, dibenzoylmethane, ethyl acetoacetate, butyl acetoacetate, lauryl acetoacetate or α-acetylcyclohexanone. Examples of o-acylphenols are 2-acetylphenol, 2-butyroylphenol, 2-acetyl-1-naphthol, 2-benzoylphenol or salicylaldehyde. The enolate is preferably the anion of a β-dicarbonyl compound having 5 to 20 carbon atoms.

Organic salts of zinc or magnesium are preferably an acetylacetonate or an aliphatic monocarboxylate having, for example, 1 to 24 carbon atoms. Magnesium acetate, laurate and stearate, zinc formate, acetate, oenanthate, laurate and stearate as well as zinc acetylacetonate and magnesium acetylacetonate are some of the particular preferred examples.

Zinc stearate, magnesium stearate, zinc laurate, magnesium laurate, zinc acetylacetonate, magnesium acetylacetonate, zinc acetate and magnesium acetate are of special interest.

The inorganic salt of zinc or magnesium is for example zinc oxide, magnesium oxide, zinc hydroxide, magnesium hydroxide, or a carbonate containing compound such as Zn-hydroxide-carbonate, Mg-hydroxide-carbonate, dolomite, e.g a Ca/Mg carbonate such as ®Microdol Super from ®Micro Minerals; or a natural or synthetic hydrotalcite.

The natural hydrotalcite is held to possess a structure Mg$_6$Al$_2$(OH)$_{16}$CO$_3$.4 H$_2$O. A typical empirical formula of a synthetic hydrotalcite is $Al_2Mg_{4.35}OH_{11.36}CO_{3(1.67)}.xH_2O$.

Examples of the synthetic product include:

$Mg_{0.7}Al_{0.3}(OH)_2(CO_3)_{0.15}.0.54\ H_2O$, $Mg_{4.5}Al_2(OH)_{13}CO_3.3.5\ H_2O$, or $Mg_{4.2}Al(OH)_{12.4}CO_3$.

Preferred synthetic hydrotalcites are L-55R®II from ®REHEIS as well as ®ZHT-4A and ®DHT-4A from ®Kyowa Chemical Industry Co.

A preferred embodiment of this invention relates to a stabilizer mixture wherein component (C) is hydrotalcite, dolomite, Zn-hydroxide-carbonate, Mg-hydroxide-carbonate, Zn-oxide, Mg-oxide, Zn-hydroxide, Mg-hydroxide, Zn-stearate, Mg-stearate, Zn-laurate, Mg-laurate, Zn-acetylacetonate, Mg-acetylacetonate, Zn-acetate or Mg-acetate.

The following combinations of components (B) and (C) are particularly preferred:

Ca oxide and Mg stearate

Ca oxide and Zn stearate

Ca oxide and hydrotalcite (®DHT-4A)

Ca hydroxide and Mg stearate

Ca hydroxide and Zn stearate

A further preferred embodiment of this invention relates to a stabilizer mixture containing additionally (D1) a pigment or (D2) an UV absorber or (D3) a pigment and an UV absorber.

The pigment (component (D1)) may be an inorganic or organic pigment.

Examples of inorganic pigments are titanium dioxide, zinc oxide, carbon black, cadmium sulfide, cadmium selenide, chromium oxide, iron oxide, lead oxide and so on.

Examples of organic pigments are azo pigments, anthraquinones, phthalocyanines, tetrachloroisoindolinones, quinacridones, isoindolines, perylenes, pyrrolopyrroles (such as Pigment Red 254) and so on.

All pigments described in "Gächter/Müller: Plastics Additives Handbook, 3rd Edition, Hanser Publishers, Munich Vienna New York", page 647 to 659, point 11.2.1.1 to 11.2.4.2 can be used as component (D1).

A particularly preferred pigment is titanium dioxide, optionally in combination with an organic pigment.

Examples of such organic pigments are:

C.I. (Colour Index) Pigment Yellow 93, C.I. Pigment Yellow 95, C.I. Pigment Yellow 138, C.I. Pigment Yellow 139, C.I. Pigment Yellow 155, C.I. Pigment Yellow 162, C.I. Pigment Yellow 168, C.I. Pigment Yellow 180, C.I. Pigment Yellow 183, C.I. Pigment Red 44, C.I. Pigment Red 170, C.I. Pigment Red 202, C.I. Pigment Red 214, C.I. Pigment Red 254, C.I. Pigment Red 264, C.I. Pigment Red 272, C.I. Pigment Red 48:2, C.I. Pigment Red 48:3, C.I. Pigment Red 53:1, C.I. Pigment Red 57:1, C.I. Pigment Green 7, C.I. Pigment Blue 15:1, C.I. Pigment Blue 15:3 and C.I. Pigment Violet 19.

Examples of the UV absorber (component (D2)) are a 2-(2'-hydroxyphenyl)benzotriazole, a 2-hydroxybenzophenone, an ester of substituted or unsubstituted benzoic acid, an acrylate, an oxamide, a 2-(2-hydroxyphenyl)-1,3,5-triazine, a monobenzoate of resorcinol or a formamidine.

The 2-(2'-hydroxyphenyl)benzotriazole is e.g. 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzo-triazole, 2-(2'-hydroxy-5'-(1,1,3,3- tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonyl-ethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol] or the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$—]$_2$ where R=3'-tert-butyl-4'-hydroxy-5'-2H-benzotriazol-2-ylphenyl.

2-(3',5'-Di-tert-butyl-2'-hydroxyphenyl)-5-chloro-benzotriazole, 2-(3'-tert-butyl-2'-hydroxy-5'-methylphenyl)-5-chloro-benzotriazole and 2-(3',5'-di-tert-amyl-2'-hydroxyphenyl)-benzotriazole are preferred.

The 2-hydroxybenzophenone is for example the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivatives.

2-Hydroxy-4-octyloxybenzophenone is preferred.

The ester of a substituted or unsubstituted benzoic acid is for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate or 2-methyl-4,6-di-tert-butylphenyl 3,5-di-tert-butyl-4-hydroxybenzoate.

2,4-Di-tert-butylphenyl 3,5-di-tert-butyl-4-hydroxybenzoate and hexadecyl 3,5-di-tert-butyl-4-hydroxybenzoate are preferred.

The acrylate is for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxy-cinnamate, methyl α-carbomethoxy-p-methoxycinnamate or N-(β-carbomethoxy-β-cyanovinyl)-2-methylindoline.

The oxamide is for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide or its mixture with 2-ethoxy-2'-ethyl-5,4'-di-tert-butoxanilide or mixtures of ortho- and para-methoxy—disubstituted oxanilides or mixtures of o- and p-ethoxy-disubstituted oxanilides.

The 2-(2-hydroxyphenyl)-1,3,5-triazine is for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethyl-phenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine or 2-(2-hydroxyphenyl)-4-(4-methoxyphenyl)-6-phenyl-1,3,5-triazine.

2-(2-Hydroxy-4-octyloxyphenyl)-4,6-bis(2,4-dimethylphenyl)-1,3,5-triazine and 2-(2-hydroxy-4-hexyloxy)phenyl-4,6-diphenyl-1,3,5-triazine are preferred.

The monobenzoate of resorcinol is for example the compound of the formula

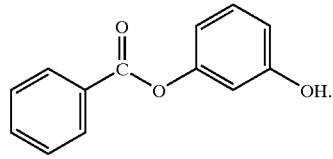

The formamidine is for example the compound of the formula

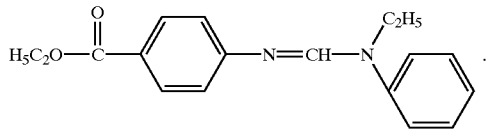

The UV absorber is in particular a 2-(2'-hydroxyphenyl)benzotriazole, a 2-hydroxybenzophenone or a hydroxyphenyltriazine.

The stabilizer mixture according to the present invention is useful for stabilizing polyolefins against degradation induced by light, heat or oxidation. Examples of suitable polyolefins are shown in the following.

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The invention therefore also relates to a composition containing a polyolefin and the stabilizer mixture as described herein and to a method for stabilizing a polyolefin against degradation induced by light, heat or oxidation, which comprises incorporating into the polyolefin the stabilizer mixture.

The polyolefins listed above under point 1 are preferred. Polyethylene and polypropylene as well as a polyethylene copolymer or a polypropylene copolymer are particularly preferred.

The invention furthermore relates to a composition comprising a polyolefin and a stabilizer mixture containing (A) a sterically hindered amine compound selected from the group consisting of the compounds 13, 14, 36-a, 36-b, 36-d, 96-I, 96-II, 100-A, 101-I, 105 and 106 as defined above;

(B) an organic salt of Ca, in particular Ca-stearate, or an inorganic salt of Ca; and (C) an organic salt of Mg, an inorganic salt of Mg, an organic salt of Zn or an inorganic salt of Zn;

with the proviso that the polyolefin is polypropylene, when component (A) of the stabilizer mixture is the compound 96-I, 96-II or 100-A.

The components (A), (B), (C) and optionally (D1) and/or (D2) may be added to the polyolefin either individually or mixed with one another.

The sterically hindered amine compound (component (A)) is present in the polyolefin in an amount of preferably 0.01 to 5%, in particular 0.01 to 1% or 0.05 to 1%, relative to the weight of the polyolefin.

The organic or inorganic salt of Ca (component (B)) is present in the polyolefin in an amount of preferably 0.005 to 5%, in particular 0.02 to 0.5%, relative to the weight of the polyolefin.

The organic or inorganic salt of Zn or Mg (component (C)) is present in the polyolefin in an amount of preferably 0.01 to 5%, in particular 0.05 to 0.5%, relative to the weight of the polyolefin.

The pigment (component (D1)) is optionally present in the polyolefin in an amount of preferably 0.01 to 10%, in particular 0.05 to 1%, relative to the weight of the polyolefin.

The UV absorber (component (D2)) is optionally present in the polyolefin in an amount of preferably 0.01 to 1%, in particular 0.05 to 0.5%, relative to the weight of the polyolefin.

The total amount of component (D3) (the pigment in combination with the UV absorber) is preferably 0.01 to 10%, relative to the weight of the organic material. The weight ratio of the UV absorber to the pigment is for example 2:1 to 1:10.

When the pigment used is titanium dioxide in combination with an organic pigment as described above, titanium dioxide is preferably present in the organic material in an amount of 0.01 to 5%, relative to the weight of the organic material, and the organic pigment may be present in an amount of, for example, 0.01 to 2%, relative to the weight of the organic material.

The weight ratio of the components (A):(B) is preferably 20:1 to 1:5.

The weight ratio of the components (A):(C) is preferably 20:1 to 1:5.

The weight ratio of the components (A):(D1) is preferably 10:1 to 1:10.

The weight ratio of the components (A):(D2) is preferably 20:1 to 1:2.

The weight ratio of the components (A):(D3) is preferably 10:1 to 1:10.

The above components can be incorporated into the polyolefin by known methods, for example before or during shaping or by applying the dissolved or dispersed compounds to the polyolefin, if necessary with subsequent evaporation of the solvent. The components can be added to the polyolefin in the form of a powder, granules or a masterbatch, which contains these components in, for example, a concentration of from 2.5 to 25% by weight.

If desired, the components (A), (B), (C) and optionally (D1) and/or (D2) can be melt blended with each other before incorporation in the polyolefin. They can be added to the polyolefin before or during the polymerization or before the crosslinking.

The polyolefin stabilized according to this invention can be used in a wide variety of forms, for example as films, fibres, tapes, moulding compositions, profiles or as binders for paints, adhesives or putties.

The stabilized polyolefin may additionally also contain various conventional additives, for example:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tri-cyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexyl-phenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxy-phenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy2-methylphenyl)pentane.

1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3, 3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3, 5-triazine, 2-octylmercapto-4,6-bis(3,5-di-tert-butyl-4-hydroxyanilino)-1,3,5-triazine, 2-octylmercapto-4,6-bis(3, 5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3.5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3.5-dicyclohexyl-4-hydroxyphenyl) propionic acid with mono- or polyhydricalcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3.5-di-tert-butyl-4-hydroxyphenyl acetic acid with mono- or polyhydric alcohols, e.g. with methanol, ethanol, octanol, octadecanol, 1,6-hexanediol, 1,9- nonanediol, ethylene glycol, 1,2-propanediol, neopentyl glycol, thiodiethylene glycol, diethylene glycol, triethylene glycol, pentaerythritol, tris-(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3.5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated di-phenylamine, for example p,p'-di-tert-octyldiphenylamine, 4-n-butylaminophenol, 4-butyrylaminophenol, 4-nonanoylamino-phenol, 4-dodecanoylaminophenol, 4-oc-tadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmetharie, N,N,N',N'-tetramethyl-4,4'-diaminodiphenylmethane, 1,2-bis[(2-methylphenyl)amino]ethane, 1,2-bis(phenylamino)propane, (o-tolyl)biguanide, Bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldi-phenylamines, a mixture of mono- und dialkylated tert-butyldiphenylamines, 2,3-di-hydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diamino-but-2-ene, N,N-bis(2,2,6,6-tetramethyl-piperid-4-yl)hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers

Nickel compounds, for example nickel complexes of 2,2'-thio-bis-[4-(1,1,3,3-tetra-methylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenyl-hydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl)methylphosphite, bis(2,4-di-tert-butyl-6-methylphenyl)ethylphosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for-example, dilauryl-thiodipropionate or distearyl thiodipro-pionate.

8. Peroxide scavengers, for example esters of β-thiodipropionic acid, for example the lauryl, stearyl, myristyl or tridecyl estersi- mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

10. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g.

4-tert-butylbenzoic acid, adipic acid, diphenylacetic acid, sodium succinate or sodium benzoate; polymeric compounds such as ionic copolymers ("ionomers").

11. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Other additives, for example, plasticisers, lubricants, emulsifiers, pigments, rheology additives, catalysts, flow-control agents, optical brighteners, flameproofing agents, antistatic agents and blowing agents.

13. Benzofuranones and indolinones, for example those disclosed in U.S. Pat. No. 4,325,863, U.S. Pat. No. 4,338,244, U.S. Pat. No. 5,175,312, U.S. Pat. No. 5,216,052, U.S. Pat. No. 5,252,643, DE-A-4316611, DE-A-4316622, DE-A-4316876, EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one,-3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

Particularly preferred conventional additives are those listed above under items 1 and/or 4.

Also the compound of the formula

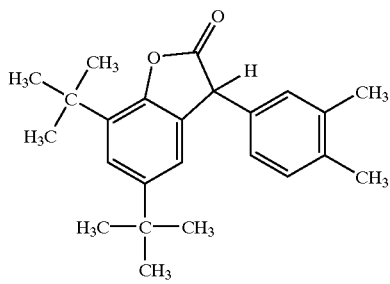

(CAS No. 181314-48-7)

is one of the preferred conventional additives which may additionally be incorporated into the polyolefin to be stabilized.

The weight ratio of the total amount of components (A), (B), (C) and optionally (D1) and/or (D2) to the total amount of the conventional additives can be, for example, 100:1 to 1:100.

The examples below illustrate the invention in greater detail. All percentages and parts are by weight, unless stated otherwise.

STERICALLY HINDERED AMINE COMPOUNDS USED IN THE FOLLOWING EXAMPLES 1 TO 3

(For the polymeric compounds, the mean degree of polymerization is indicated in each case.)

Compound 13:
(®Tinuvin 770)

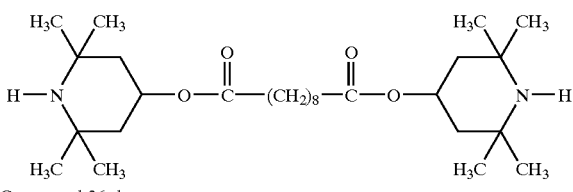

Compound 36-d:
(®Sanduvor PR-31)

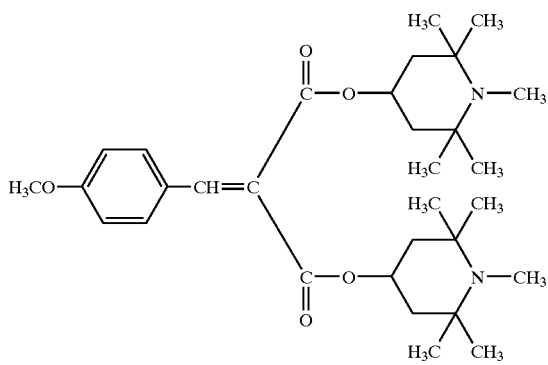

Compound 81:
(®Tinuvin 622)

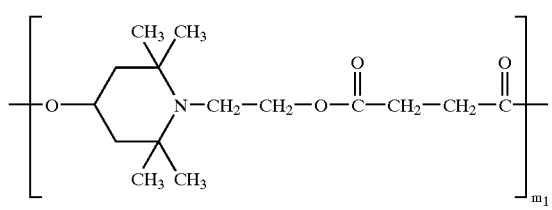

with $m_1$ being 5.1.

Compound 84-1:
(®Chimassorb 944)

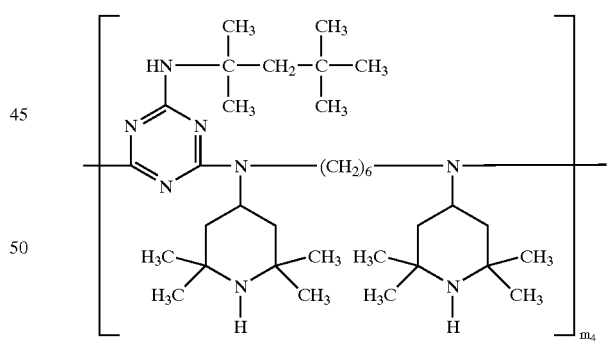

with $m_4$ being 4.5.

Mixture of the compounds 96-I and 96-II:
(Preferably ®Hostavin N30)

(96-I)

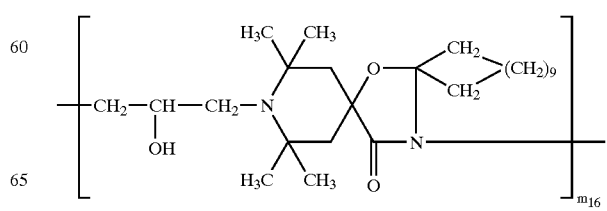

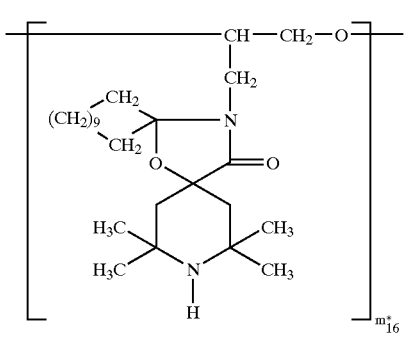

(96-II)

with $m_{16}$ being 3.9 and $m_{16}^*$ being 4.2 and the weight ratio of (96-I) to (96-II) being 4:1.

Compound 100-A:

(®Uvasorb HA88 (Chemical Abstracts CAS No. 136 504-96-6))

A product obtainable by reacting an intermediate product, obtained by reaction of a polyamine of the formula (100a–I) with cyanuric chloride, with a compound of the formula (100b-I).

$H_2N-(CH_2)_3-NH-(CH_2)_2-NH-(CH_2)_3-NH_2$ (100a-I)

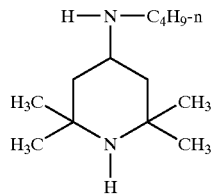 (100b-I)

Compound 101-I:
(Preferably ®Uvasil 299)

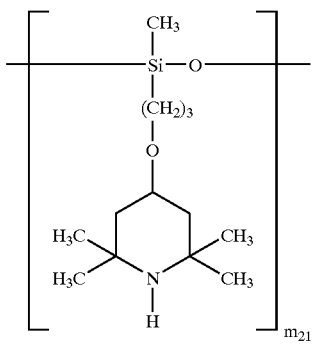

with $m_{21}$ being 5.8.

Compound 105:
(®Goodrite UV 3150)

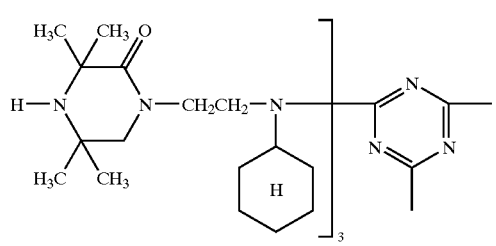

Compound 106:
(®Goodrite UV 3159)

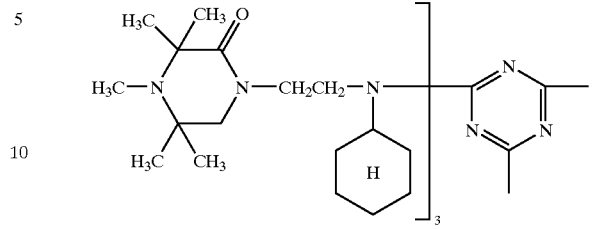

Example 1

Light Stabilization of Injection Molded 2 mm Polypropylene Plaques 100 parts of polypropylene powder (melt flow index: ~2.4 g/10 min at 230° C. and 2160 g) are blended in a barrel mixer with 0.05 parts of pentaerythrityl-tetrakis[3-(3,5-di-tert-butyl-4-hydroxyphenyl)propionate], 0.05 parts of tris[2,4-di-tert-butylphenyl] phosphite, and the stabilizer system indicated in Tables 1 to 3. Then, the blend is compounded in an extruder at temperatures of 200°–220° C. The granules obtained on extrusion and granulation are transformed into 2 mm thick plaques at 240°–260° C. in an automatic injection molding machine.

The plaques are mounted on sample holders and subjected to natural weathering in Florida (45° South, direct, approximately 140 kLy/year). Periodically, the carbonyl content of the samples is measured with an infrared spectrophotometer. The exposure time corresponding to formation of a carbonyl absorbance of 0.5 is a measure for the efficiency of the stabilizer system.

The values obtained are summarized in Tables 1 to 3.

The synergistic effect of the two coadditivs ((1) and (2)) is determined by a comparison of the calculated $T_{0.5}$ value with the actually measured $T_{0.5}$ value. The $T_{0.5}$ values are calculated on the basis of the additivity law (B. Ranby and J. F. Rabek; Photodegradation, Photo-oxidation and Photo-stabilization of Polymers, Principles and Applications, John Wiley & Sons, London, New York, Sydney, Toronto, 1975, pages 418 and 419) according to the following equation:

$$\text{Expected stabilizing activity} = \frac{\text{Stabilizing activity of } 100\% \ (1) + \text{stabilizing activity of } 100\% \ (2)}{2}$$

There is a synergistic effect for the two coadditivs in question, when $T_{0.5 \ measured} > T_{0.5 \ calculated}$.

TABLE 1

| Sterically hindered amine compound: 0.1% of the compound 81 | | |
|---|---|---|
| Coadditiv | $T_{0.5 \ measured}$ (kLy) | $T_{0.5 \ calculated}$ (kLy) |
| 0.1% of Ca-oxide | 63 | |
| 0.1% of Zn-hydroxide-carbonate | 81 | |
| 0.05% of Zn-hydroxide-carbonate + 0.05% of Ca-oxide | 86 | 72 |

TABLE 2

Sterically hindered amine compound: 0.1% of the compound 84-1

| Coadditiv | $T_{0.5\ measured}$ (kLy) | $T_{0.5\ calculated}$ (kLy) |
|---|---|---|
| 0.1% of Ca-stearate | 88 | |
| 0.1% of Ca-oxide | 150 | |
| 0.1% of hydrotalcite (®DHT-4A) | 144 | |
| 0.1% of Zn-hydroxide-carbonate | 136 | |
| 0.05% of Ca-oxide + 0.05% of hydrotalcite (®DHT-4A) | 180 | 147 |
| 0.05% of Zn-hydroxide-carbonate + 0.05% of Ca-stearate | 168 | 112 |
| 0.05% of Zn-hydroxide-carbonate + 0.05% of Ca-oxide | 172 | 143 |

TABLE 3

Sterically hindered amine compound: 0.05% of the compound 81
UV absorber: 0.05% of the compound of the formula

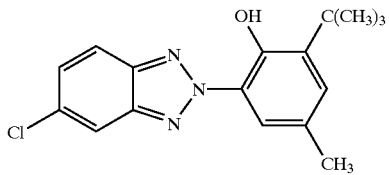

| Coadditiv | $T_{0.5\ measured}$ (kLy) | $T_{0.5\ calculated}$ (kLy) |
|---|---|---|
| 0.1% of Ca-stearate | 136 | |
| 0.1% of Ca-oxide | 102 | |
| 0.1% of Ca-hydroxide | 149 | |
| 0.1% of hydrotalcite (®DHT-4A) | 127 | |
| 0.1% of Zn-hydroxide-carbonate | 121 | |
| 0.1% of Mg-stearate | 216 | |
| 0.1% of Zn-stearate | 200 | |
| 0.1% of Mg-acetylacetonate | 202 | |
| 0.1% of Mg-oxide | 176 | |
| 0.1% of Zn-oxide | 70 | |
| 0.1% of Mg-hydroxide | 146 | |
| 0.1% of dolomite (®Microdol Super) | 77 | |
| 0.1% of Zn-acetylacetonate | 68 | |
| 0.05% of hydrotalcite (®DHT-4A) + 0.05% of Ca-oxide | 116 | 114.5 |
| 0.05% of Zn-hydroxide-carbonate + 0.05% of Ca-stearate | 182 | 128.5 |
| 0.05% of Zn-hydroxide-carbonate + 0.05% of Ca-oxide | 175 | 111.5 |
| 0.05% of dolomite (®Microdol Super) + 0.05% of Ca-stearate | 112 | 106.5 |
| 0.05% of Mg-stearate + 0.05% of Ca-oxide | 252 | 159 |
| 0.05% of Mg-stearate + 0.05% of Ca-hydroxide | 222 | 182.5 |
| 0.05% of Zn-stearate + 0.05% of Ca-oxide | 168 | 151 |
| 0.05% of Mg-acetylacetonate + 0.05% of Ca-oxide | 240 | 152 |
| 0.05% of Mg-acetylacetonate + 0.05% of Ca-hydroxide | 248 | 175.5 |
| 0.05% of Zn-acetylacetonate + 0.05% of Ca-oxide | 97 | 85 |
| 0.05% of Zn-acetylacetonate + 0.05% of Ca-hydroxide | 126 | 108.5 |
| 0.05% of Mg-oxide + 0.05% of Ca-oxide | 148 | 139 |
| 0.05% of Zn-oxide + 0.05% of Ca-oxide | 89 | 86 |
| 0.05% of Ca-oxide + 0.05% of Mg-hydroxide | 137 | 124 |

Example 2

Light Stabilization of Polypropylene Tapes 100 parts of polypropylene powder (melt flow index: 2 g/10 min at 230° C. and 2160 g) are blended in a barrel mixer with 0.05 parts of pentaerythrityl tetrakis[3-(3,5-di-tert-butyl-4-hydroxyphenyl)propionate], 0.05 parts of tris[2,4-di-tert-butylphenyl]phosphite and the stabilizer system indicated in Table 4. Then, the blend is compounded in an extruder at temperatures of 180°–220° C. The granules obtained on extrusion and granulation are transformed into films at 220°–260° C. in a second extruder equipped with a flat sheet die. The films are cut into ribbons which are drawn to achieve a stretch ratio of 1:6. The tapes obtained with this procedure are finally 50 μm thick and 2.5 mm wide.

The tapes are mounted without tension on sample holders and exposed in a WEATHER-OMETER Ci 65 (black panel temperature 63±2° C., without water-spraying). Periodically, the tensile strength of the exposed tapes is measured. The exposure time corresponding to a loss of 50% ($T_{50}$) of the initial tensile strength is a measure for the efficiency of the stabilizer system.

The values obtained are summarized in Table 4.

The determination of the synergistic effect of the two coadditivs is carried out as described in Example 1.

TABLE 4

0.4% of titanium dioxide (rutile)

| | $T_{50\ measured}$ (hours to 50% retained tensile strength) | | | |
|---|---|---|---|---|
| Sterically hindered amine compound | 0.05% of Ca-stearate + 0.05% of hydrotalcite (®DHT-4A) | 0.1% of Ca-stearate | 0.1% of hydrotalcite (®DHT-4A) | $T_{50\ calculated}$ |
| 0.05% of compound 13 | 3360 | 2150 | 1920 | 2035 |
| 0.10% of compound 13 | 7600 | 5600 | 4300 | 4950 |
| 0.20% of compound 13 | 14500 | 13500 | 10000 | 11750 |

Example 3

Light Stabilization of Compression Molded 0.5 mm Polypropylene Copolymer Films 100 parts of unstabilized polypropylene powder (melt flow index: ~6 g/10 min at 230° C. and 2160 g) are homogenized at 200° C. for 10 min in a Brabender plastograph with 0.05 parts of pentaerythrityl-tetrakis[3-(3,5-di-tert-butyl-4-hydroxyphenyl)propionate], 0.10 parts of tris[2,4-di-tert-butylphenyl]phosphite, and the stabilizer system indicated in Tables 5 to 8. The material thus obtained is compression molded in a laboratory press between two aluminum foils for 6 min at 260° C. to a 0.5 mm thick film which is cooled immediately to room temperature in a water-cooled press. Samples of 60 mm×25 mm are cut out of these 0.5 mm films and exposed in a WEATHER-OMETER Ci 65 (black panel temperature 63±2° C., without water-spraying). Periodically, these samples are removed from the exposure apparatus and their carbonyl content is measured with an infrared spectrophotometer. The exposure time corresponding to formation of a carbonyl absorbance of 0.1 is a measure for the efficiency of the stabilizer system. The values obtained are summarized in Tables 5 to 8.

TABLE 5

0.1% of Ca-stearate,
0.1% of Mg-stearate and
0.1% of the compound of the formula

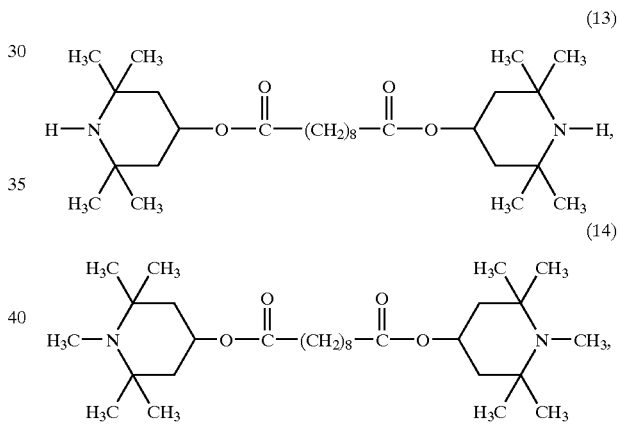

| 0.1% of sterically hindered amine compound | $T_{0.1}$ (h) |
|---|---|
| Compound 101-I | 3680 |
| Compound 100-A | 3200 |
| Mixture of compounds 96-I and 96-II | 2480 |
| Compound 105 | 2920 |
| Compound 106 | 2600 |
| Compound 36-d | 3080 |

TABLE 6

0.1% of Ca-stearate,
0.1% of hydrotalcite (®DHT-4A) and
0.1% of the compound of the formula

| 0.1% of sterically hindered amine compound | $T_{0.1}$ (h) |
|---|---|
| Compound 101-I | 3680 |
| Compound 100-A | 3460 |
| Compound 106 | 4400 |

TABLE 7

0.1% of Ca-stearate,
0.1% of Mg-stearate and
0.5% of TiO₂ (rutile)

| 0.1% of sterically hindered amine compound | $T_{0.1}$ (h) |
|---|---|
| Compound 101-I | 4530 |
| Compound 100-A | 3340 |
| Compound 105 | 3280 |
| Compound 106 | 3320 |
| Compound 36-d | 3340 |

TABLE 8

0.1% of Ca-stearate,
0.1% of hydrotalcite (®DHT-4A) and
0.1% of TiO₂ (rutile)

| 0.1% of sterically hindered amine compound | $T_{0.1}$ (h) |
|---|---|
| Compound 101-I | 4120 |
| Compound 100-A | 4080 |

TABLE 8-continued 0.1% of Ca-stearate,
0.1% of hydrotalcite (®DHT-4A) and
0.1% of TiO₂ (rutile)

| 0.1% of sterically hindered amine compound | $T_{0.1}$ (h) |
|---|---|
| Compound 105 | 3905 |
| Compound 106 | 3955 |

What is claimed is:

1. A composition comprising polypropylene and a light stabilizer mixture containing (A) 0.05 to 1% by weight, relative to the weight of the polypropylene, of a sterically hindered amine compound selected from the group consisting of the compounds 13, 14, 36-a, 36-b, 36-d, (81), (84-1), 96-I, 96-II, the product 100-A, 101-I, 105 and 106

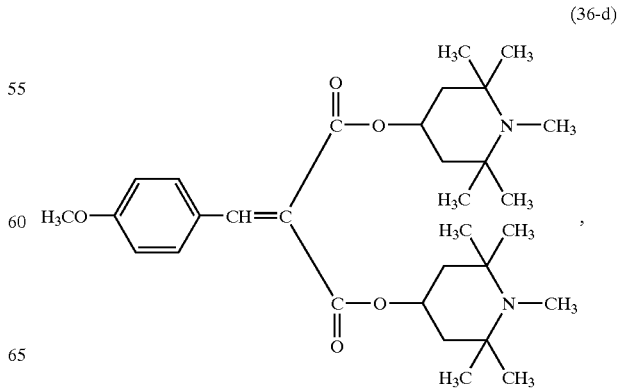

(36-a) 1,2,3,4-tetrakis{2,2,6,6-tetramethylpiperidin-4-yloxycarbonyl}butane, (36-b) 1,2,3,4-tetrakis{1,2,2,6,6-pentamethylpiperidin-4-yloxycarbonyl}butane, (81)

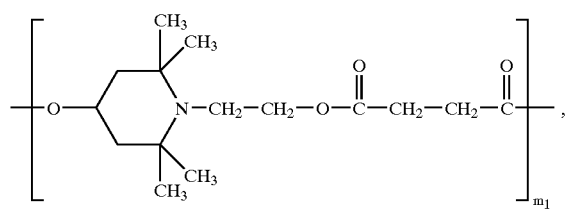

with m₁ being a number from 2 to 50.

(84-1)

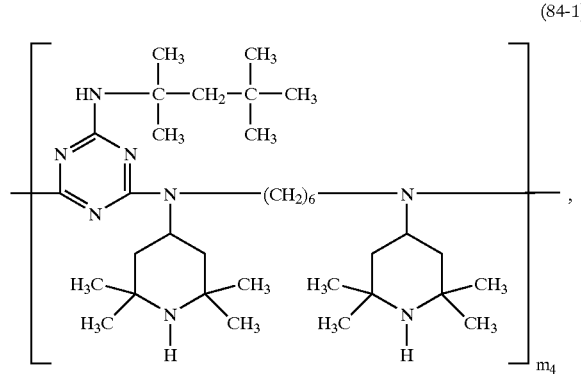

with m₄ being a number from 2 to 50;

(96-I)

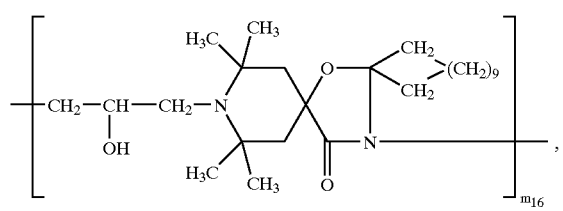

(96-II)

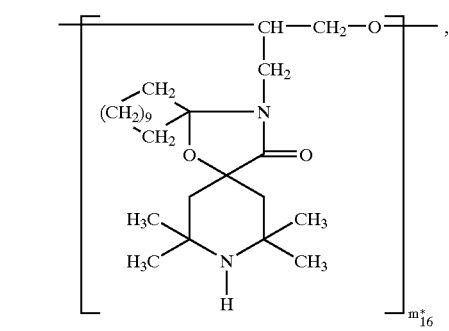

with $m_{16}$ and $m_{16}^*$ being a number from 2 to 50;

a product (100-A) obtained by reacting an intermediate product, obtained by reaction of a polyamine of the formula (100a–I) with cyanuric chloride, with a compound of the formula (100b–I), (100a-I)

(100b-I)

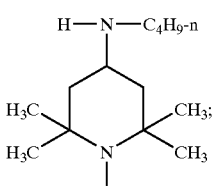

(101-I)

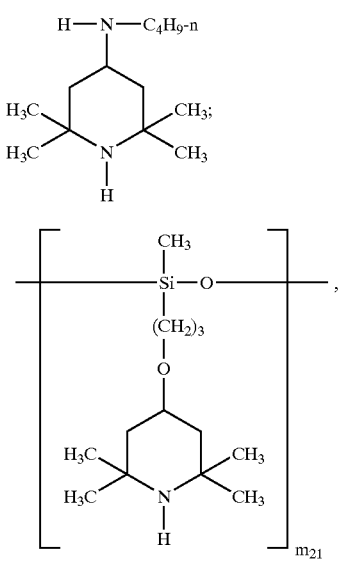

with m₂₁ being a number from 2 to 20;

(105)

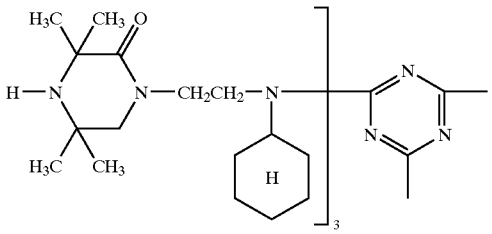

and (106)

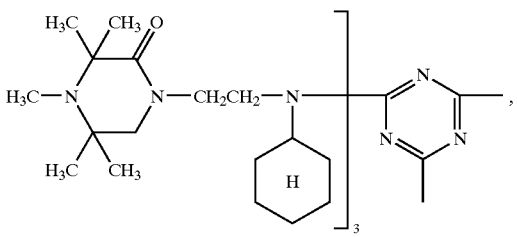

(B) 0.02 to 0.5% by weight, relative to the weight of the polypropylene, of CaO and (C) 0.05 to 0.5% by weight, relative to the weight of the polypropylene, of an aliphatic zinc or magnesium monocarboxylate having 1 to 24 carbon atoms.

2. A method for stabilizing polypropylene against degradation induced by light, heat or oxidation, which comprises incorporating into the polypropylene a stabilizer mixture according to claim 1.

3. A composition according to claim 1 wherein component (C) is Zn-stearate, Mg-stearate, Zn-laurate, Mg-laurate, Zn-acetate or Mg acetate.

4. A composition according to claim 1 wherein
    component (B) is Ca oxide and component (C) is Mg stearate,
    component (B) is Ca oxide and component (C) is Zn stearate.

5. A composition according to claim 1, containing additionally (D1) a pigment or
(D2) an UV absorber or
(D3) a pigment and an UV absorber.

6. A composition according to claim 5 wherein the pigment is titanium dioxide, zinc oxide, carbon black, cadmium sulfide, cadmium selenide, chromium oxide, iron oxide, lead oxide, an azo pigment, an anthraquinone, a phthalocyanine, a tetrachlorolindolinone, a quinacridone, an isoindoline, a perylene or a pyrrolopyrrole.

7. A composition according to claim 5 wherein the UV absorber is a 2-(2'-hydroxyphenyl)benzotriazole, a 2-hydroxybenzophenone, an ester of substituted or unsubstituted benzoic acid, an acrylate, an oxamide, a 2-(2-hydroxyphenyl)-1,3,5-triazine, a monobenzoate of resorcinol or a formamidine.

8. A composition according to claim 1 wherein the product (100-A) is a compound of the formula

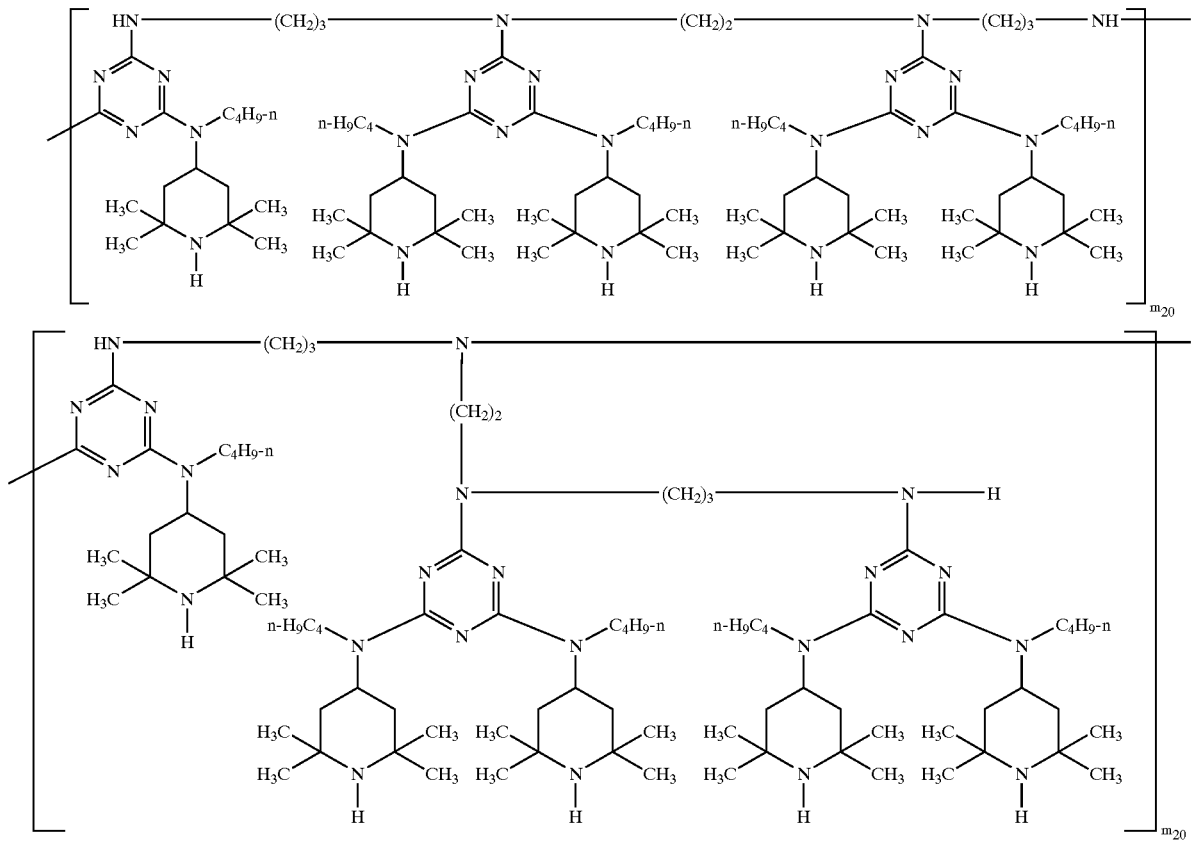

or

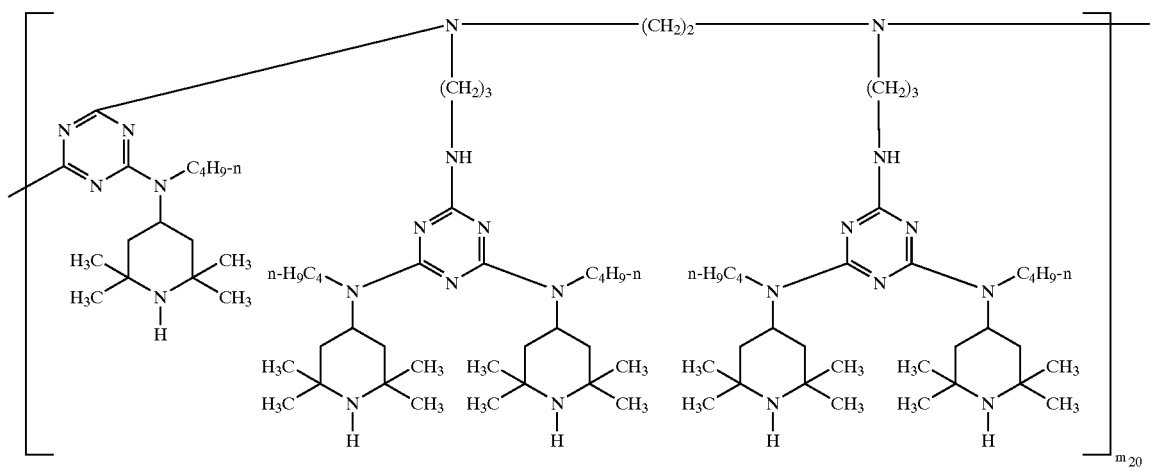

wherein $m_{20}$ is 1 to 20,
or a mixture of these three compounds.

9. A composition according to claim 1 wherein the product (100-A) is a compound of the formula
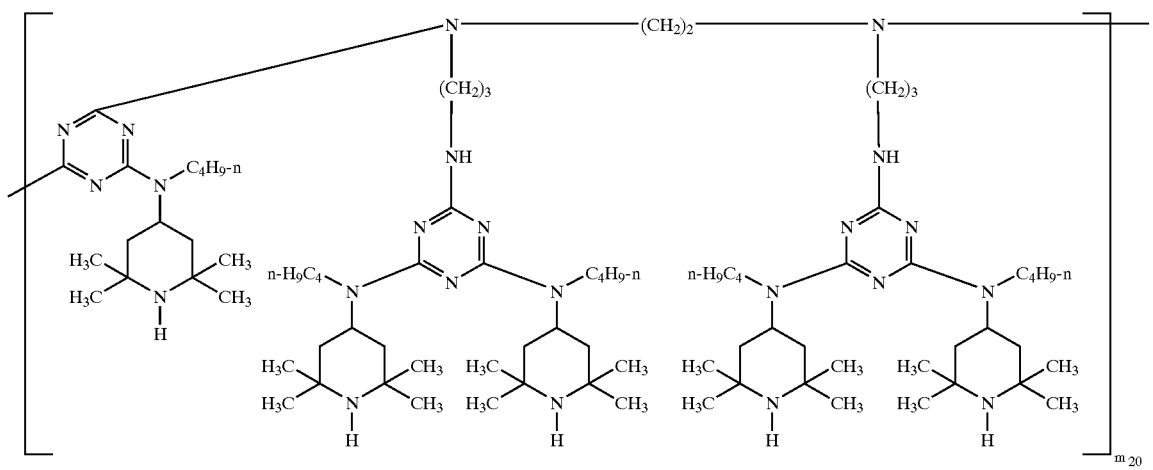
wherein $m_{20}$ is 1 to 20.
* * * * *

UNITED STATES PATENT AND TRADEMARK OFFICE
CERTIFICATE OF CORRECTION

PATENT NO. : 6,881,772 B2
DATED : April 19, 2005
INVENTOR(S) : François Gugumus

It is certified that error appears in the above-identified patent and that said Letters Patent is hereby corrected as shown below:

<u>Title page,</u>
Item [30], should read:
-- [30]  Foreign Application Priority Data
      23 Dec. 1997      [EPO]      97811019.5 --.

Signed and Sealed this

Twenty-fifth Day of April, 2006

JON W. DUDAS
*Director of the United States Patent and Trademark Office*